US012711467B2

(12) United States Patent
Rodriguez et al.

(10) Patent No.: US 12,711,467 B2
(45) Date of Patent: Aug. 18, 2026

(54) AUTOMATED TRAINING OF MACHINE LEARNING CLASSIFICATION FOR PATIENT MISSED CARE OPPORTUNITIES OR LATE ARRIVALS

(71) Applicants: GE Precision Healthcare LLC, Milwaukee, WI (US); Partners Healthcare System, Inc., Boston, MA (US); The General Hospital Corporation, Boston, MA (US); The Brigham and Women's Hospital, Inc., Boston, MA (US)

(72) Inventors: Ezra Nathaniel Ojeda Rodriguez, Fresno, CA (US); Edward H Lail, Maryville, TN (US); Steven Guitron, Pleasant Grove, UT (US); Oleg Pianykh, Newton Highlands, MA (US); Vamsee Rangavajhala, Naperville, IL (US); Murat Akturk, Freiburg (DE)

(73) Assignees: GE Precision Healthcare LLC, Waukesha, WI (US); Partners Healthcare System, Inc., Boston, MA (US); The General Hospital Corporation, Boston, MA (US); The Brigham and Women's Hospital, Inc., Boston, MA (US)

( * ) Notice: Subject to any disclaimer, the term of this patent is extended or adjusted under 35 U.S.C. 154(b) by 1138 days.

(21) Appl. No.: 17/585,903

(22) Filed: Jan. 27, 2022

(65) Prior Publication Data

US 2023/0237369 A1 Jul. 27, 2023

(51) Int. Cl.

*G06Q 10/1093* (2023.01)
*G06N 20/20* (2019.01)

(Continued)

(52) U.S. Cl.

CPC ......... *G06Q 10/1093* (2013.01); *G06N 20/20* (2019.01); *G06N 3/0895* (2023.01);

(Continued)

(58) Field of Classification Search

CPC .. G06Q 10/1095; G06N 20/20; G06N 3/0895; G06N 3/09; G06N 5/01; G06N 20/00

See application file for complete search history.

(56) References Cited

U.S. PATENT DOCUMENTS

2010/0106517 A1* 4/2010 Kociubinski .......... G16H 40/20 705/2
2015/0242819 A1* 8/2015 Moses ................ G06Q 10/1093 705/7.19

(Continued)

FOREIGN PATENT DOCUMENTS

WO 2020/120633 A1 6/2020
WO 2021/236623 A1 11/2021

OTHER PUBLICATIONS

Denney et al., "Machine Learning Predictions of No-Show Appointments in a Primary Care Setting" 2019, SMU Data Science Review: vol. 2, No. 1, pp. i-34. (Year: 2019).*

(Continued)

*Primary Examiner* — Miranda M Huang
*Assistant Examiner* — Chase P. Hinckley
(74) *Attorney, Agent, or Firm* — Amin, Turocy & Watson, LLP

(57) ABSTRACT

Systems/techniques that facilitate automated training of machine learning classification for patient missed care opportunities or late arrivals are provided. In various embodiments, a system can access a set of annotated data candidates defined by two or more feature categories. In various aspects, the system can train a machine learning classifier on the set of annotated data candidates, thereby (Continued)

causing internal parameters of the machine learning classifier to become iteratively updated. In various instances, the system rank the two or more feature categories in order of classification importance, based on the iteratively updated internal parameters of the machine learning classifier. In various cases, the system can perform one or more electronic actions based on the two or more feature categories being ranked in order of classification importance.

20 Claims, 16 Drawing Sheets

(51) Int. Cl.

| | |
|---|---|
| *G06N 3/0895* | (2023.01) |
| *G06N 3/09* | (2023.01) |
| *G06N 5/01* | (2023.01) |
| *G06N 20/00* | (2019.01) |

(52) U.S. Cl.

CPC ................ *G06N 3/09* (2023.01); *G06N 5/01* (2023.01); *G06N 20/00* (2019.01)

(56) References Cited

U.S. PATENT DOCUMENTS

| | | | | |
|---|---|---|---|---|
| 2019/0267133 | A1 | 8/2019 | Schwarz et al. | |
| 2020/0160984 | A1 | 5/2020 | Vegas Santiago et al. | |
| 2020/0160986 | A1* | 5/2020 | Vegas Santiago | G06N 5/01 |
| 2020/0302358 | A1* | 9/2020 | Mcbride | G06N 3/092 |
| 2020/0349170 | A1* | 11/2020 | Rajendiran | G06T 11/206 |
| 2021/0224419 | A1 | 7/2021 | Mcbride et al. | |
| 2022/0101986 | A1* | 3/2022 | Liu | G06Q 10/1095 |
| 2022/0199237 | A1* | 6/2022 | Garver | G16H 40/20 |
| 2022/0277842 | A1* | 9/2022 | Ross | G06Q 10/1095 |
| 2023/0162847 | A1* | 5/2023 | Iyengar | G06Q 10/0631 705/2 |
| 2023/0214784 | A1* | 7/2023 | Kakade | G16H 40/20 705/7.19 |
| 2023/0237369 | A1* | 7/2023 | Rodriguez | G06Q 10/1093 706/12 |
| 2023/0238123 | A1* | 7/2023 | Narumanchi | G16H 40/20 705/2 |

OTHER PUBLICATIONS

Lee et al., "Leveraging on Predictive Analytics to Manage Clinic No-Show and Improve Accessibility of Care" Jan. 18, 2018, IEEE International Conference on Data Science and Advanced Analysis, pp. 429-438. (Year: 2018).*

Boughorbel et al., "Fairness in TabNet Model by Disentangled Representation for the Prediction of Hospital No-Show" Mar. 6, 2021, arXiv: 2103.04048v1, pp. 1-9. (Year: 2021).*

Narumanchi et al., "AI-Based Application to Predict Appointment Adherence in Pediatric Settings" Jan. 21, 2022, U.S. Appl. No. 63/301,547, pp. 1-34. (Year: 2022).*

Chong et al., "Artificial Intelligence Predictive Analytics in the Management of Outpatient MRI Appointment No-Shows" Nov. 2020, pp. 1155-1162. (Year: 2020).*

Liu et al., "Visual Diagnosis of Tree Boosting Methods" Jan. 2018, IEEE Transactions on Visualization and Computer Graphics vol. 24, No. 1, pp. 163-173. (Year: 2018).*

Chen et al., "Application of Machine Learning to Predict Patient No-Shows in an Academic Pediatric Opthalmology Clinic" Jan. 25, 2021, pp. 293-302. (Year: 2021).*

Chen et Guestrin, "XGBoost: A Scalable Tree Boosting System" Jan. 10, 2016, arXiv: 1603.02754v3, pp. 1-13. (Year: 2016).*

Al-Muhaideb et al., "Prediction of hospital no-show appointments through artificial intelligence algorithms" Dec. 5, 2019, pp. 373-381. (Year: 2019).*

Alshaya et al., "Predicting No-show Medical Appointments Using Machine Learning" Dec. 5, 2019, pp. 1-14. (Year: 2019).*

Athanasiou et al., "An explainable XGBoost-based approach towards assessing the risk of cardiovascular disease in patients with Type 2 Diabetes Mellitus" Nov. 14, 2020, arXiv: 2009.06629v2, pp. 1-6. (Year: 2020).*

Salazar et al., "Using Different Models of Machine Learning to Predict Attendance at Medical Appointments" Jul. 30, 2020, pp. 1-11. (Year: 2020).*

Goodfellow et al., "Deep Learning" 2016, pp. i-777. (Year: 2016).*

International Search Report and Written Opinion received for PCT Application Serial No. PCT/US2023/010300 dated May 4, 2023, 9 pages.

Chong Le Roy et al: "Artificial Intelligence Predictive Analytics in the Management of Outpatient MRI Appointment No-Shows", American Journal of Roentgenology, vol. 215, No. 5, Sep. 9, 2020 (Sep. 9, 2020), pp. 1155-1162, XP093349041, US ISSN: 0361-803X, DOI: 10.2214/AJR.19.22594.

EP application 23747471.3 filed Jul. 15, 2024—extended Search Report Jan. 16, 2026; 9 pages.

* cited by examiner

700
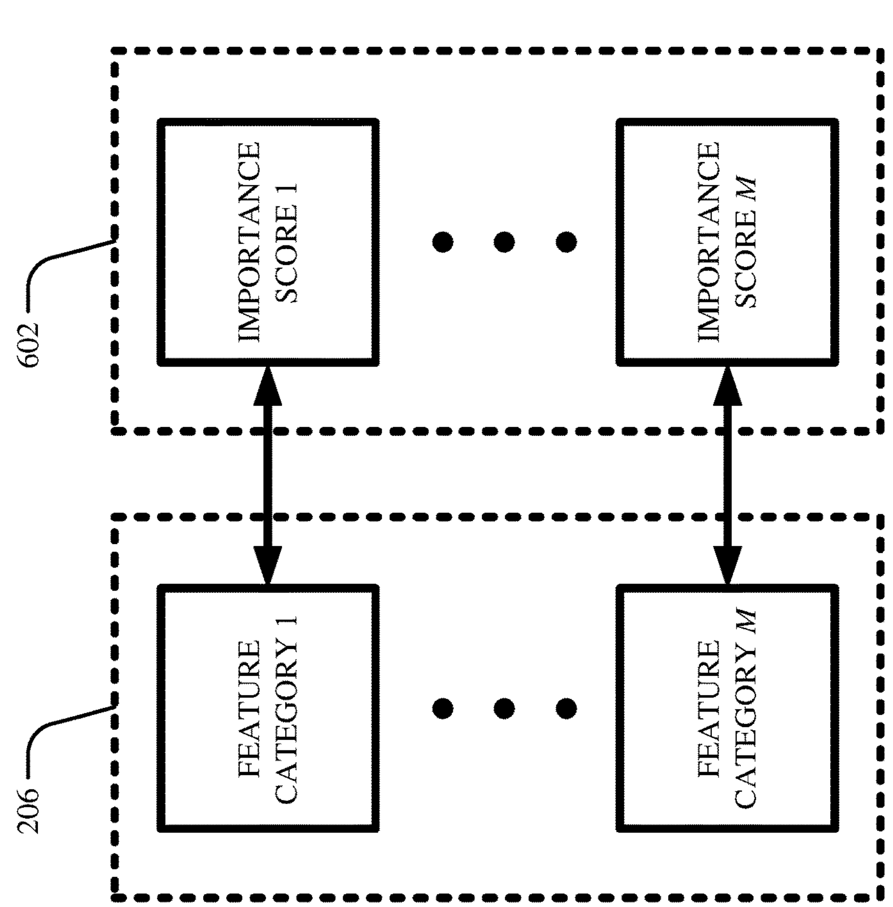

Figure 14:
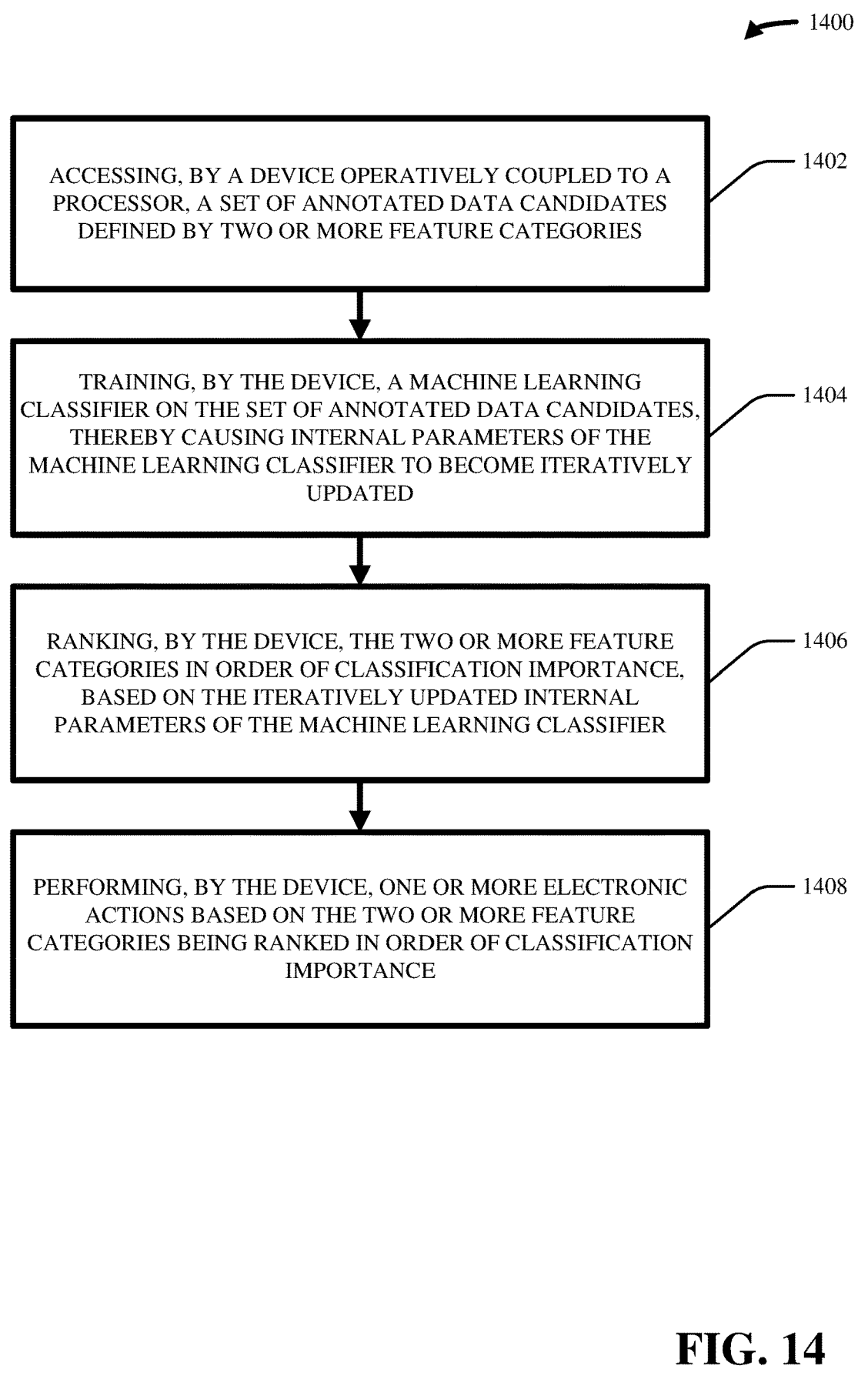

1400

ACCESSING, BY A DEVICE OPERATIVELY COUPLED TO A PROCESSOR, A SET OF ANNOTATED DATA CANDIDATES DEFINED BY TWO OR MORE FEATURE CATEGORIES

1402

TRAINING, BY THE DEVICE, A MACHINE LEARNING CLASSIFIER ON THE SET OF ANNOTATED DATA CANDIDATES, THEREBY CAUSING INTERNAL PARAMETERS OF THE MACHINE LEARNING CLASSIFIER TO BECOME ITERATIVELY UPDATED

1404

RANKING, BY THE DEVICE, THE TWO OR MORE FEATURE CATEGORIES IN ORDER OF CLASSIFICATION IMPORTANCE, BASED ON THE ITERATIVELY UPDATED INTERNAL PARAMETERS OF THE MACHINE LEARNING CLASSIFIER

1406

PERFORMING, BY THE DEVICE, ONE OR MORE ELECTRONIC ACTIONS BASED ON THE TWO OR MORE FEATURE CATEGORIES BEING RANKED IN ORDER OF CLASSIFICATION IMPORTANCE

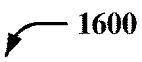
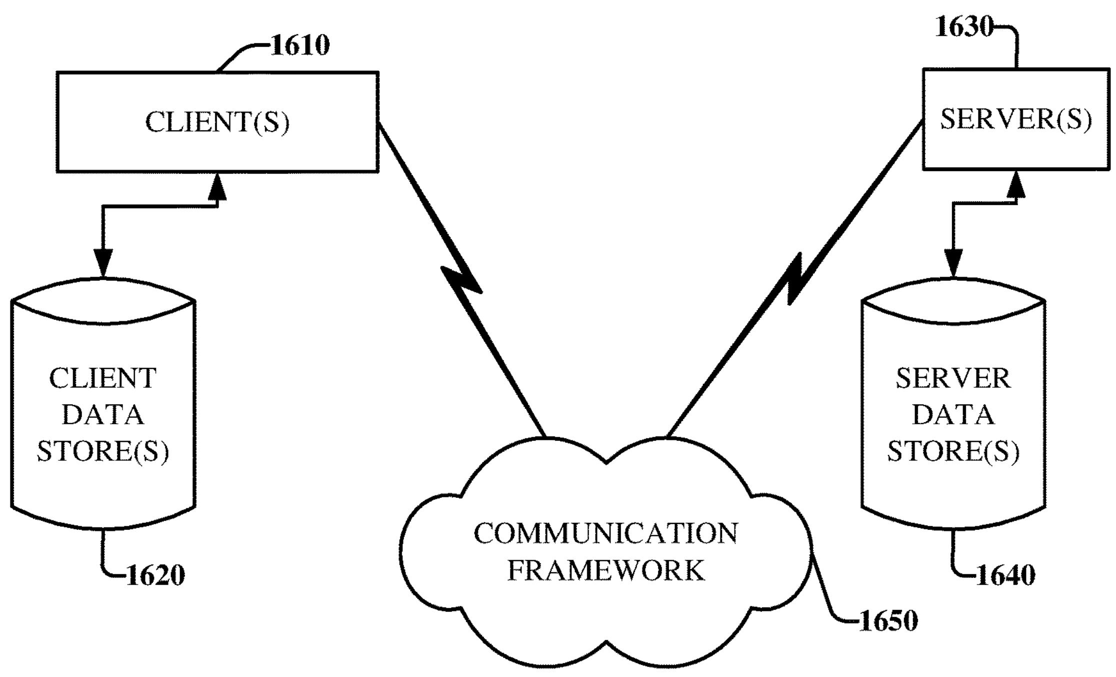
FIG. 16

AUTOMATED TRAINING OF MACHINE LEARNING CLASSIFICATION FOR PATIENT MISSED CARE OPPORTUNITIES OR LATE ARRIVALS

TECHNICAL FIELD

The subject disclosure relates generally to machine learning classification, and more specifically to automated training of machine learning classification for patient missed care opportunities or late arrivals.

BACKGROUND

Medical patients often have scheduled medical appointments with medical professionals. When a patient fails to show up for such a scheduled medical appointment, medical professionals' time and/or resources which have been allotted to handle the scheduled medical appointment can be considered as wasted. Accordingly, it can be desirable to train a machine learning classifier to predict whether given patients are likely to not show up for their scheduled medical appointments. Unfortunately, existing machine learning classifiers that are trained to make such predictions often exhibit excessively inaccurate performance.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate automated training of machine learning classification for patient missed care opportunities or late arrivals are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various aspects, the receiver component can access a set of annotated data candidates defined by two or more feature categories. In various instances, the computer-executable components can further comprise a training component. In various cases, the training component can train a machine learning classifier on the set of annotated data candidates, thereby causing internal parameters of the machine learning classifier to become iteratively updated. In various aspects, the computer-executable components can further comprise a feature component. In various instances, the feature component can rank the two or more feature categories in order of classification importance, based on the iteratively updated internal parameters of the machine learning classifier. In various cases, the computer-executable component can further comprise an execution component. In various aspects, the execution component can perform one or more electronic actions based on the two or more feature categories being ranked in order of classification importance.

According to one or more embodiments, the above-described system can be implemented as a computer-implemented method and/or a computer program product.

DESCRIPTION OF THE DRAWINGS

FIG. 7 illustrates an example, non-limiting block diagram showing a set of feature category importance scores in accordance with one or more embodiments described herein.

FIG. 14 illustrates a flow diagram of an example, non-limiting computer-implemented method that facilitates automated training of machine learning classification for patient missed care opportunities or late arrivals in accordance with one or more embodiments described herein.

FIG. 16 illustrates an example networking environment operable to execute various implementations described herein.

DETAILED DESCRIPTION

Figure 1:
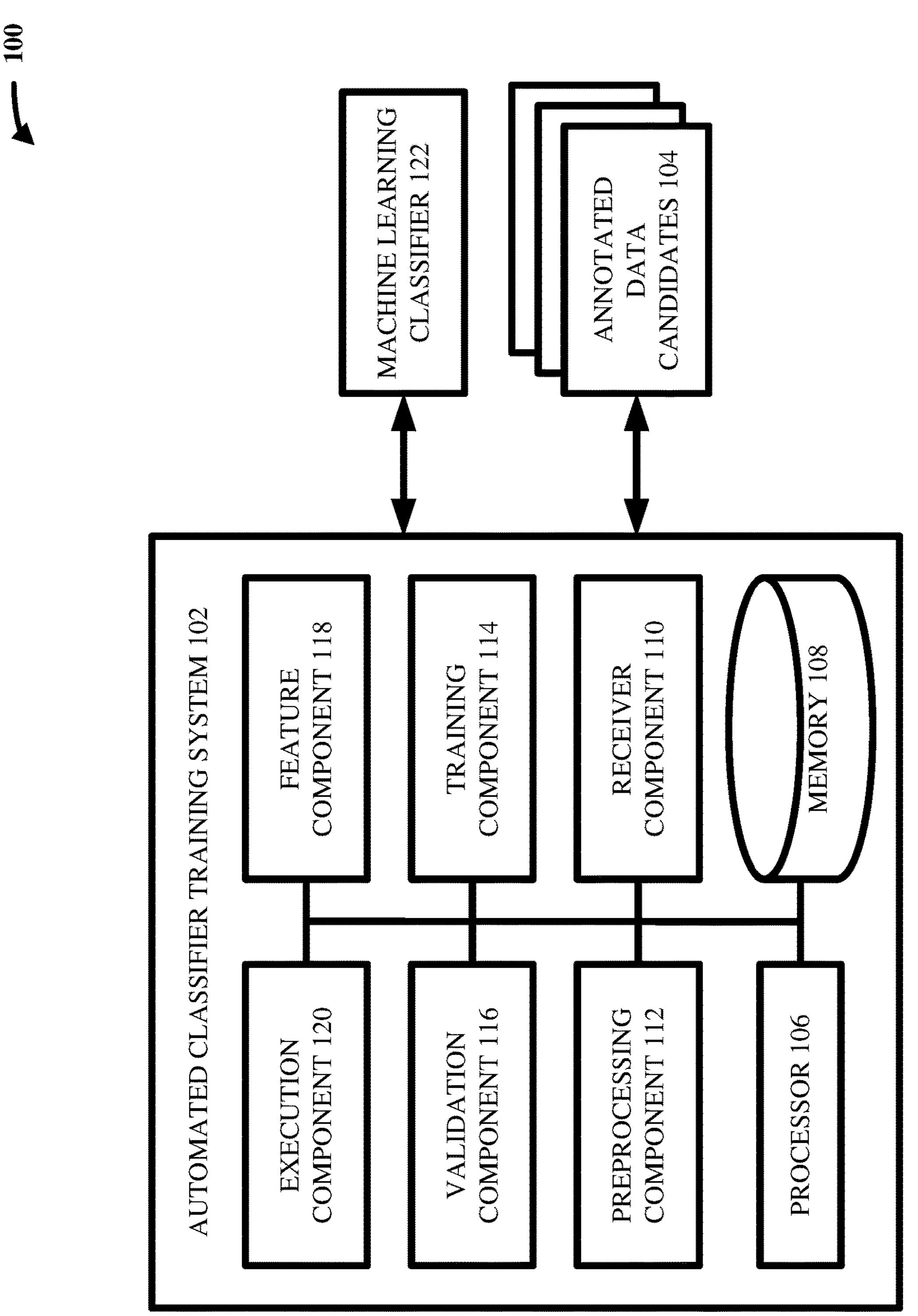
FIG. 1 illustrates a block diagram of an example, non-limiting system that facilitates automated training of machine learning classification for patient missed care opportunities or late arrivals in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Medical patients can have scheduled medical appointments with medical professionals. When a patient fails to show up for (e.g., fails to attend) such a scheduled medical appointment, medical professionals' time and/or resources which have been allotted to handle the scheduled medical appointment can be considered as wasted. Indeed, such no-shows can be especially wasteful in radiology practices, due to the high fixed costs associated with readying radiological imaging equipment and/or with paying specially-trained medical staff. Accordingly, it can be desirable to train a machine learning classifier to predict whether given patients are likely to not show up for their scheduled medical appointments, so that wasted time and/or resources can be minimized.

Unfortunately, existing machine learning classifiers that are trained to make such predictions often exhibit excessively inaccurate performance. Specifically, existing machine learning classifiers that are trained to predict whether a medical patient is likely to not show up to their scheduled medical appointment (e.g., that are trained to classify the medical patient as likely to show up or instead as likely to not show up) can exhibit recall rates as low as 32%, precision rates as low as 29%, and/or area-under-curve scores as low as 0.78.

Furthermore, such existing machine learning classifiers only predict likelihood of show versus likelihood of no-show for a given medical patient. In other words, such existing machine learning classifiers do not address in any way the fact that time and/or resources of medical professionals can still be wasted even when a medical patient shows up to a scheduled medical appointment. For instance, and as recognized by the present inventors, if a medical patient shows up late to their scheduled medical appointment, medical professionals' time and/or resources can still have been wasted by such tardiness, albeit wasted to a lesser degree than if the medical patient had not shown up at all. Unfortunately, such existing machine learning classifiers completely ignore this possibility of medical patients showing up late to scheduled medical appointments.

Accordingly, systems and/or techniques that can address one or more of these technical problems can be desirable.

Various embodiments of the subject innovation can address one or more of these technical problems. One or more embodiments described herein include systems, computer-implemented methods, apparatus, and/or computer program products that can facilitate automated training of machine learning classification for patient missed care opportunities or late arrivals. In some aspects, the inventors of various embodiments described herein recognized that existing machine learning classifiers that are trained to predict show-vs-no-show of medical patients suffer from excessively low performance metrics because such existing machine learning classifiers are often trained on data that contains irrelevant and/or weak feature categories. In other words, the present inventors recognized that configuring a machine learning classifier to analyze a set of input features, where one or more of such set of input features are irrelevant and/or otherwise weakly-predictive with respect to the desired output classification, can cause the machine learning classifier to become bogged down and/or otherwise distracted, thereby yielding reduced accuracy and/or reduced precision. Furthermore, the present inventors recognized that, when such existing machine learning classifiers predict that a particular patient will show up for a particular scheduled medical appointment, such existing machine learning classifiers are not configured and/or trained in any way to predict whether that particular patient is likely to show up late or on-time to the particular scheduled medical appointment. Accordingly, the present inventors devised various embodiments described herein, which can address these shortcomings of existing techniques.

In various aspects, various embodiments described herein can be considered as a computerized tool (e.g., any suitable combination of computer-executable hardware and/or computer-executable software) that can facilitate automated training of machine learning classification for patient missed care opportunities or late arrivals. In various instances, the computerized tool can comprise a receiver component, a preprocessing component, a training component, a validation component, a feature component, and/or an execution component.

In various embodiments, there can be a set of annotated data candidates and a machine learning classifier that is desired to be trained on the set of annotated data candidates. In various aspects, the set of annotated data candidates can include any suitable number of annotated data candidates. In various instances, each annotated data candidate can include a data candidate and an annotation that respectively corresponds to the data candidate. In various cases, each data candidate can be any suitable electronic information having any suitable format and being defined by two or more feature categories (e.g., also referred to as attribute categories). That is, a data candidate can be any suitable alphanumeric piece of data that includes, conveys, and/or otherwise represents two or more features (e.g., one feature per feature category, one attribute per attribute category). As a non-limiting example, suppose that a data candidate is defined by $l$ feature categories for any suitable positive integer $l \geq 2$. In such case, the data candidate can include $l$ features, where each feature can be represented by one or more scalars, one or more vectors, one or more matrices, one or more tensors, and/or one or more character strings. That is, all of such $l$ scalars, vectors, matrices, tensors, and/or character strings can collectively be considered as forming the data candidate.

In various aspects, the two or more feature categories can pertain to any suitable types of information. As a non-limiting example, the two or more feature categories can include any suitable information relating to medical patients that have scheduled medical appointments with medical professionals and/or with healthcare facilities. For instance, the two or more feature categories can include: an appointment-date category (e.g., a feature belonging to this category can be one or more scalars, vectors, matrices, tensors, and/or character strings that indicate a time and/or date on which a given scheduled medical appointment of a given patient is planned to take place); an allocation-date category (e.g., a feature belonging to this category can be one or more scalars, vectors, matrices, tensors, and/or character strings that indicate a time and/or date on which a given scheduled medical appointment of a given patient was established, set up, penciled in, and/or otherwise allocated in advance); an admission-type category (e.g., a feature belonging to this category can be one or more scalars, vectors, matrices, tensors, and/or character strings that indicate whether a given scheduled medical appointment of a given patient is an outpatient visit or an inpatient visit); a department category (e.g., a feature belonging to this category can be one or more scalars, vectors, matrices, tensors, and/or character strings that indicate which particular medical department of a healthcare facility is to perform a given scheduled medical appointment of a given patient, such as a radiology department, an endocrinology department, a dermatology department, an audiology department, an obstetrician department, and/or a surgery department); a modality category (e.g., a feature belonging to this category can be one or more scalars, vectors, matrices, tensors, and/or character strings that indicate which particular medical equipment modality is to be used during a given scheduled medical appointment of a given patient, such as a computed tomography (CT) scanner, an X-ray scanner, a magnetic resonance imaging (MRI) scanner, an ultrasound scanner, and/or a positron emission tomography (PET) scanner); an age category (e.g., a feature belonging to this category can be one or more scalars, vectors, matrices, tensors, and/or character strings that indicate an age and/or birth date of a given patient); an education category (e.g., a feature belonging to this category can be one or more scalars, vectors, matrices, tensors, and/or character strings that indicate a highest level of education and/or a highest educational degree obtained by a given patient); an employment category (e.g., a feature belonging to this category can be one or more scalars, vectors, matrices, tensors, and/or character strings that indicate an occupation and/or profession of a given patient); a pathology category (e.g., a feature belonging to this category can be one or more scalars, vectors, matrices, tensors, and/or character strings that indicate existing pathologies, diseases, ailments, diagnoses, and/or prognoses of a given patient); an ethnicity category (e.g., a feature belonging to this category can be one or more scalars, vectors, matrices, tensors, and/or character strings that indicate an ethnicity, citizenship, and/or national origin of a given patient); an insurance category (e.g., a feature belonging to this category can be one or more scalars, vectors, matrices, tensors, and/or character strings that indicate whether and/or through what provider a given patient is medically insured); a residence category (e.g., a feature belonging to this category can be one or more scalars, vectors, matrices, tensors, and/or character strings that indicate where a given patient lives in relation to, and/or how far the given patient lives from, a healthcare facility that is slated to host a scheduled medical appointment of the given patient); a traffic category (e.g., a feature belonging to this category can be one or more scalars, vectors, matrices, tensors, and/or character strings that indicate a forecasted amount of traffic that is expected, during any suitable time interval preceding a scheduled medical appointment of a given patient, to accumulate around a residence of the given patient, around a healthcare facility that is slated to host the scheduled medical appointment, and/or along a route from the residence to the healthcare facility); and/or a weather category (e.g., a feature belonging to this category can be one or more scalars, vectors, matrices, tensors, and/or character strings that indicate a forecasted weather event that is expected, during any suitable time interval preceding a scheduled medical appointment of a given patient, to occur around a residence of the given patient, around a healthcare facility that is slated to host the scheduled medical appointment, and/or along a route from the residence to the healthcare facility). These are mere non-limiting examples of potential feature categories. Accordingly, those having ordinary skill in the art will appreciate that any other suitable feature categories can be implemented as desired.

In various aspects, each annotation can correspond to a respective data candidate, and can be a ground-truth label (e.g., can be one or more ground-truth scalars, vectors, matrices, tensors, and/or character strings) that indicates a correct and/or accurate classification that is known and/or deemed to correspond to that respective data candidate. In various instances, such annotations can pertain to any suitable type of classification as desired. As a non-limiting example, when the two or more feature categories include information relating to medical patients that have scheduled medical appointments, then each annotation can indicate whether or not a given medical patient is likely to show up to and/or attend his/her scheduled medical appointment. Furthermore, in some cases, if a particular annotation indicates that a given medical patient is likely to show up to and/or attend his/her scheduled medical appointment, then the particular annotation can further indicate whether or not the given medical patient is likely to show up late (e.g., be tardy) to his/her scheduled medical appointment. Further still, in some aspects, if a particular annotation indicates that a given medical patient is likely to show up late to his/her scheduled medical appointment, then the particular annotation can further indicate an amount and/or duration of time by which the given medical patient is likely to be late and/or tardy to his/her scheduled medical appointment. Accordingly, in various aspects, the possible classifications which an annotation can indicate can be considered as follows: no-show, on-time show, and/or late-show. As those having ordinary skill in the art will appreciate, such annotations can be manually crafted and/or can be obtained from historical/recorded data.

In any case, the set of annotated data candidates can include data candidates that are defined by two or more feature categories, and the set of annotated data candidates can further include annotations that respectively correspond to the data candidates.

In various aspects, the machine learning classifier that is desired to be trained on the set of annotated data candidates can exhibit any suitable artificial intelligence architecture as desired. For example, the machine learning classifier can exhibit a decision tree architecture (e.g., XGBoost). In such case, the machine learning classifier can include any suitable number of decision nodes, any suitable decision thresholds at such decision nodes, any suitable number of leaf nodes, and/or any suitable classification thresholds at such leaf nodes. As another example, the machine learning classifier can exhibit a deep learning neural network architecture. In such case, the machine learning classifier can include any suitable number of layers (e.g., input layer, one or more hidden layers, output layer), can include any suitable numbers of neurons in various layers (e.g., different layers can have the same and/or different numbers of neurons as each other), can include any suitable activation functions (e.g., softmax, sigmoid, hyperbolic tangent, rectified linear unit) in various neurons (e.g., different neurons can have the same and/or different activation functions as each other), and/or can include any suitable interneuron connections (e.g., forward connections, skip connections, recurrent connections). In various aspects, the machine learning classifier can exhibit any other suitable artificial intelligence architecture as desired (e.g., logistic regression, linear regression, naïve Bayes, support vector machine).

In any case, the machine learning classifier can be configured to receive as input a data candidate from the set of annotated data candidates and to produce as output a classification having the same format as the annotations in the set of annotated data candidates. Accordingly, in various instances, it can be desired to train the machine learning classifier on the set of annotated data candidates (e.g., to train the machine learning classifier to predict no-show versus on-time-show versus late-show for a medical patient that is represented by a given data candidate).

In various embodiments, the receiver component of the computerized tool can electronically receive and/or otherwise electronically access the set of annotated data candidates and/or the machine learning classifier. In some aspects, the receiver component can electronically retrieve the set of annotated data candidates and/or the machine learning classifier from any suitable centralized and/or decentralized data structure (e.g., graph data structure, relational data structure, hybrid data structure), whether remote from and/or local to the receiver component. In any case, the receiver component can electronically obtain and/or access the set of annotated data candidates and/or the machine learning classifier, such that other components of the computerized tool can electronically interact with (e.g., read, write, edit, copy, manipulate) the set of annotated data candidates and/or the machine learning classifier.

In various embodiments, the preprocessing component of the computerized tool can electronically apply any suitable preprocessing, sorting, and/or filtering techniques to the set of annotated data candidates. For example, in various aspects, the preprocessing component electronically reformat the set of annotated data candidates in any suitable fashion as desired. As another example, in various instances, the preprocessing component can electronically remove and/or delete feature categories whose features exhibit no variance throughout the set of annotated data candidates (e.g., for a particular feature category, each data candidate in the set of annotated data candidates can have a feature belonging to the particular feature category; if the features that belong to the particular feature category are identical across all the data candidates, then the particular feature category can be deleted). As still another example, in various cases, the preprocessing component can electronically remove and/or delete feature categories whose features exhibit significantly many null and/or not-available values throughout the set of annotated data candidates (e.g., for a particular feature category, each data candidate in the set of annotated data candidates can have a feature belonging to the particular feature category; if more than any suitable threshold proportion of data candidates have a null and/or not-available value for the particular feature category, then the particular feature category can be deleted). As yet another example, in various aspects, the preprocessing component can electronically remove and/or delete data candidates whose features exhibit significantly many null and/or not-available values (e.g., each data candidate in the set of annotated data candidates can have one feature per feature category; if any data candidate has more than any suitable threshold proportion of features with null and/or not-available values, then that data candidate can be deleted).

In various embodiments, the training component of the computerized tool can electronically train the machine learning classifier on the set of annotated data candidates (e.g., after the set of annotated data candidates have been preprocessed by the preprocessing component). For example, suppose that the machine learning classifier is a decision tree model. In such case, the training component can fit the machine learning classifier to the set of annotated data candidates via any suitable sample splitting techniques (e.g., splitting the data candidates according to annotation based on estimate of positive correctness, splitting the data candidates according to annotation based on Gini impurity, splitting the data candidates according to annotation based on information gain, splitting the data candidates according to annotation based on variance reduction, splitting the data candidates according to annotation based on measure of "goodness"). Furthermore, in various instances, the training component can perform any suitable pruning techniques (e.g., reduced error pruning, cost complexity pruning) on the machine learning classifier after such sample splitting. In any case, the ultimate result can be that the machine learning classifier now has internal parameters (e.g., decision node locations, decision node thresholds, leaf node locations, and/or leaf node thresholds) that have been optimized to accurately classify inputted data candidates.

As another example, suppose that the machine learning classifier is instead a deep learning neural network. In such case, the internal parameters (e.g., weights, biases) of the machine learning classifier can be randomly initialized. In various aspects, the training component can select, from the set of annotated data candidates, a data candidate and an annotation that corresponds to the data candidate. In various instances, the training component can feed the selected data candidate as input to the machine learning classifier, which can cause the machine learning classifier to produce some output. More specifically, in various cases, an input layer of the machine learning classifier can receive the selected data candidate, the selected data candidate can complete a forward pass through one or more hidden layers of the machine learning classifier, and an output layer of the machine learning classifier can compute the output based on activations provided by the one or more hidden layers of the machine learning classifier. In various instances, the output can be considered as the inferred classification which the machine learning classifier believes should correspond to the selected data candidate, whereas the selected annotation can be considered as the ground-truth classification that is known to correspond to the selected data candidate. Note that, if the machine learning classifier has so far undergone no and/or little training, then the output can be highly inaccurate (e.g., the output can be very different from the selected annotation). In any case, the training component can compute an error and/or loss between the output and the selected annotation, and the training component can update the internal parameters of the machine learning classifier by performing backpropagation based on the computed error and/or loss. In various instances, the training component can repeat this training procedure for each (and/or fewer, in some cases) data candidate in the set of annotated data candidates, with the ultimate result being that the internal parameters (e.g., weights, biases) of the machine learning classifier can become iteratively optimized to accurately classify inputted data candidates. Those having ordinary skill in the art will appreciate that any suitable training batch sizes, any suitable training termination criteria, and/or any suitable error/loss functions can be implemented by the training component as desired.

In any case, the training component can electronically train the machine learning classifier on the set of annotated data candidates, with the result being that the internal parameters (e.g., weights and/or biases for a neural network; node locations and/or node thresholds for a decision tree model; regression coefficients for a regression model) can become updated and/or optimized for accurately classifying inputted data candidates. In other words, no matter the particular structure and/or architecture of the machine learning classifier, the machine learning classifier can have configurable internal parameters that are updated and/or optimized during training.

In various embodiments, the validation component of the computerized tool can, after completion of training by the training component, electronically compute one or more performance metrics of the machine learning classifier. In some cases, the training component can have refrained from training the machine learning classifier on any suitable subset of the set of annotated data candidates. Accordingly, the validation component can utilize such subset for testing and/or validation of the machine learning classifier. As those having ordinary skill in the art will appreciate, the one or more performance metrics can, in various instances, include an accuracy level of the machine learning classifier, a precision level of the machine learning classifier, a recall level of the machine learning classifier, an area-under-curve level of the machine learning classifier, a true-positive rate of the machine learning classifier, a false-positive rate of the machine learning classifier, a true-negative rate of the machine learning classifier, a false-negative rate of the machine learning classifier, and/or any other suitable performance metric as desired.

In various embodiments, the feature component of the computerized tool can electronically generate a set of feature category importance scores, based on the updated/optimized internal parameters of the machine learning classifier. In various aspects, the set of feature category importance scores can include one importance score per feature category. For instance, if the two or more feature categories include a total of $l$ categories for any suitable positive integer $l \geq 2$ (e.g., a first feature category to an $l$-th feature category), then the set of feature category importance scores can include $l$ scores (e.g., a first importance score to an $l$-th importance score). In various instances, each importance score can be a scalar (and/or a vector, matrix, tensor, and/or character string, in other instances) that represents how important a corresponding feature category is with respect to the desired classification. For example, suppose that a particular importance score corresponds to a particular feature category. If the particular importance score is small (e.g., if the magnitude of the particular importance score is less than any suitable threshold value), this can indicate and/or convey that the particular feature category is not very important with respect to the desired classification (e.g., can indicate that the particular feature category is weakly predictive of the desired classification). On the other hand, if the particular importance score is large (e.g., if the magnitude of the particular importance score is greater than any suitable threshold value), this can indicate and/or convey that the particular feature category is important with respect to the desired classification (e.g., can indicate that the particular feature category is strongly predictive of the desired classification). As a mere non-limiting example, an importance score can be a real scalar whose value ranges between 0 and 1, with 0 indicating weak predictiveness with respect to the desired classification, and with 1 indicating strong predictiveness with respect to the desired classification. In other cases, however, 0 can indicate strong predictiveness while 1 can indicate weak predictiveness. In still other cases, different value ranges can be implemented (e.g., the value and/or magnitude of an importance score can range from any suitable first real value to any suitable second real value). As another non-limiting example, an importance score can be a positive integer value that indicates a rank among the two or more feature categories. In some cases, a rank and/or importance score of 1 can be considered as indicating a feature category that is the most strongly predictive/important with respect to the desired classification, a rank and/or importance score of 2 can be considered as indicating a feature category that is the second most strongly predictive/important with respect to the desired classification, and/or a rank and/or importance score of $q$ can be considered as indicating a feature category that is the $q$-th most strongly predictive/important with respect to the desired classification for any suitable positive integer $q$.

In any case, the feature component can electronically compute the set of feature category importance scores based on the updated/optimized internal parameters of the machine learning classifier. As a non-limiting example, the feature component can, in some cases, accomplish this computation analytically. For instance, if the machine learning classifier is a decision tree model, then each decision node of the machine learning classifier can correspond to a respective one of the two or more feature categories (e.g., each decision node can represent a decision split based on a respective feature category). Accordingly, for any give decision node in the machine learning classifier, an importance score of the decision node can be computed and/or calculated based on the location of the decision node. For instance, the particular feature category that corresponds to the root node (e.g., the first decision node) of the machine learning classifier can be considered as the most important and/or most strongly predictive of the two or more features categories. Accordingly, the feature component can assign an appropriate importance score to the particular feature category that corresponds to the root note (e.g., the particular feature category that corresponds to the root node can be given a best importance score and/or rank). Moreover, for any other given decision node in the machine learning classifier, an importance score and/or rank can be assigned to the feature category that corresponds to that given decision node, based on the distance between that given decision node and the root node. In other words, decision nodes that are closer to the root node (e.g., that are located higher up in the decision tree) can be considered as more important and/or more strongly predictive than decision nodes that are farther from the root node (e.g., that are located lower down in the decision tree).

As another non-limiting example, rather than implementing analytical techniques, the feature component can compute the set of feature category importance scores via execution of artificial intelligence. For instance, the feature component can, in various cases, electronically store, electronically maintain, electronically control, and/or otherwise electronically access an importance score generation machine learning model. In various aspects, the importance score generation machine learning model can exhibit any suitable artificial intelligence architecture as desired. For example, the importance score generation machine learning model can exhibit a deep learning neural network architecture. In such case, the importance score generation machine learning model can include any suitable number of layers (e.g., input layer, one or more hidden layers, output layer), can include any suitable numbers of neurons in various layers (e.g., different layers can have the same and/or different numbers of neurons as each other), can include any suitable activation functions (e.g., softmax, sigmoid, hyperbolic tangent, rectified linear unit) in various neurons (e.g., different neurons can have the same and/or different activation functions as each other), and/or can include any suitable interneuron connections (e.g., forward connections, skip connections, recurrent connections). In any case, the importance score generation machine learning model can be configured to receive as input the updated/optimized internal parameters of the machine learning classifier and/or indications of the two or more feature categories, and the importance score generation machine learning model can be further configured to produce as output the set of feature category importance scores. More specifically, there can be one or more first scalars, vectors, matrices, tensors, and/or character strings that represent the updated/optimized internal parameters of the machine learning classifier. Moreover, there can be one or more second scalars, vectors, matrices, tensors, and/or character strings that represent the two or more feature categories. In various aspects, the one or more first scalars, vectors, matrices, tensors, and/or character strings can be concatenated with the one or more second scalars, vectors, matrices, and/or character strings, such concatenation can be received by an input layer of the importance score generation machine learning model, such concatenation can complete a forward pass through one or more hidden layers of the importance score generation machine learning model, and an output layer of the importance score generation machine learning model can compute the set of feature category importance scores based on activations provided by the one or more hidden layers of the importance score generation machine learning model. In various aspects, as explained in more detail herein, such importance score generation machine learning model can be trained in any suitable fashion so as to accurately infer feature category importance scores based on inputted internal parameters of the machine learning classifier.

Accordingly, in various aspects, the feature component can electronically execute the importance score generation machine learning model on the updated/optimized internal parameters, thereby yielding the set of feature category importance scores.

In various embodiments, the execution component of the computerized tool can electronically initiate any suitable electronic actions based on the set of feature category importance scores. As a non-limiting example, the execution component can electronically transmit one or more of the set of feature category importance scores to any suitable computing device as desired. As another non-limiting example, the execution component can electronically render one or more of the set of feature category importance scores on any suitable computer screen, display, and/or monitor. As still another non-limiting example, the execution component can electronically identify which, if any, of the set of feature category importance scores satisfy any suitable threshold value, can electronically identify the feature categories that correspond to such identified importance scores, and/or can electronically transmit to any suitable computing device indications of such identified feature categories. As yet another non-limiting example, the execution component can electronically identify which, if any, of the set of feature category importance scores satisfy any suitable threshold value, can electronically identify the feature categories that correspond to such identified importance scores, and/or can electronically render on any suitable computer screen, display, and/or monitor indications of such identified feature categories. As even another non-limiting example, the execution component can electronically identify which, if any, of the set of feature category importance scores fail to satisfy any suitable threshold value, can electronically identify the feature categories that correspond to such identified importance scores, and/or can electronically transmit to any suitable computing device indications of such identified feature categories. As another non-limiting example, the execution component can electronically identify which, if any, of the set of feature category importance scores fail to satisfy any suitable threshold value, can electronically identify the feature categories that correspond to such identified importance scores, and/or can electronically render on any suitable computer screen, display, and/or monitor indications of such identified feature categories.

In some cases, when the execution component identifies feature categories whose importance scores fail to satisfy any suitable threshold value, the execution component can electronically delete, remove, erase, and/or otherwise eliminate such identified feature categories from the set of annotated data candidates. In other words, the execution component can determine which feature categories are considered as too weakly-predictive of the desired classification, and the execution component can accordingly remove such weakly-predictive feature categories from the set of annotated data candidates. For example, if the i-th feature category is considered as too weakly-predictive for any suitable positive integer i, then the i-th feature category can be removed from the set of annotated data candidates (e.g., the i-th feature of each data candidate can be deleted). In such cases, the execution component can be considered as generating an updated set of annotated data candidates. In various aspects, the training component can reconfigure and/or retrain the machine learning classifier based on the updated set of annotated data candidates. As experimentally verified by the present inventors, retraining the machine learning classifier after weakly-predictive and/or irrelevant feature categories have been removed from the set of annotated data candidates can cause the machine learning classifier to attain better performance metrics (e.g., to achieve better accuracy, better precision, better area-under-curve). After such retraining, the execution component can electronically deploy the machine learning classifier in any suitable operational context (e.g., can electronically execute the retrained machine learning classifier on any suitable data candidate that is encountered in the field).

Accordingly, various embodiments described herein include a computerized tool that can facilitate automated training of machine learning classification for patient missed care opportunities or late arrivals. More specifically, it can be desired to train a machine learning classifier to classify medica patients that have scheduled medical appointments as either no-show, on-time-show, or late-show. In various cases, the computerized tool can train the machine learning classifier on a set of annotated data candidates that are defined by two or more feature categories, the computerized tool can rank the two or more feature categories based on classification importance and/or predictive relevance, the computerized tool can remove and/or delete weakly-predictive feature categories from the set of annotated data candidates, and the computerized tool can retrain the machine learning classifier on the set of annotated data candidates after such removal/deletion of weakly-predictive feature categories. The ultimate result can be improved performance of the machine learning classifier.

Various embodiments of the subject innovation can be employed to use hardware and/or software to solve problems that are highly technical in nature (e.g., to facilitate automated training of machine learning classification for patient missed care opportunities or late arrivals), that are not abstract and that cannot be performed as a set of mental acts by a human. Further, some of the processes performed can be performed by a specialized computer (e.g., machine learning classifier, decision tree model, deep learning neural network) for carrying out defined tasks related to automated training of machine learning classification for patient missed care opportunities or late arrivals. For example, such defined tasks can include: accessing, by a device operatively coupled to a processor, a set of annotated data candidates defined by two or more feature categories; training, by the device, a machine learning classifier on the set of annotated data candidates, thereby causing internal parameters of the machine learning classifier to become iteratively updated; ranking, by the device, the two or more feature categories in order of classification importance, based on the iteratively updated internal parameters of the machine learning classifier; and performing, by the device, one or more electronic actions based on the two or more feature categories being ranked in order of classification importance. In various cases, the one or more electronic actions can include: identifying, by the device, which of the two or more feature categories are ranked below a threshold value; deleting, by the device, such feature categories from the set of annotated data candidates, thereby yielding an updated set of annotated data candidates; and retraining, by the device, the machine learning classifier based on the updated set of annotated data candidates.

Such defined tasks are not performed manually by humans. Indeed, neither the human mind nor a human with pen and paper can electronically receive training data defined by various attribute categories, can electronically train (e.g., via backpropagation and/or sample splitting) a machine learning classifier on the training data, can electronically rank the attribute categories based on the trained, updated, and/or optimized internal parameters of the machine learning classifier, electronically delete from the training data attribute categories that are ranked below a threshold value, and/or electronically retrain the machine learning classifier on the training data after such deletion. Instead, various embodiments of the subject innovation are inherently and inextricably tied to computer technology and cannot be implemented outside of a computing environment (e.g., a machine learning classifier, such as a decision tree classifier and/or a neural network classifier, is an inherently-computerized construct that simply cannot be implemented in any way by the human mind without computers; accordingly, a computerized tool that trains a machine learning classifier on a dataset, that determines which features of the dataset are predictively weak, that deletes such weak features from the dataset, and that retrains the machine learning classifier on the dataset after such deletion is likewise inherently-computerized and cannot be implemented in any sensible, practical, or reasonable way without computers).

Moreover, various embodiments of the subject innovation can integrate into a practical application various teachings described herein relating to automated training of machine learning classification for patient missed care opportunities or late arrivals. As explained above, existing techniques can cause machine learning classifiers to achieve quite low performance metrics. The present inventors realized that such low performance metrics are often caused because existing techniques train machine learning classifiers on irrelevant and/or weakly-predictive features (e.g., such machine learning classifiers can become distracted by irrelevant and/or weakly-predictive features). Accordingly, the present inventors devised various embodiments described herein. Specifically, various embodiments described herein can train a machine learning classifier on a set of annotated data candidates. Furthermore, after such training, various embodiments described herein can analyze (e.g., analytically and/or via artificial intelligence) the trained, updated, and/or optimized internal parameters of the machine learning classifier, so as to rank the feature categories that define the set of annotated data candidates in order of classification importance. In various cases, various embodiments described herein can delete from the set of annotated data candidates any feature categories whose ranks (e.g., whose classification importance scores) fail to satisfy any suitable threshold value. Accordingly, various embodiments described herein can retrain the machine learning classifier on the set of annotated data candidates after such deletion, which can cause the machine learning classifier to achieve significantly improved performance (e.g., the weakly-predictive features can be no longer present to distract and/or bog down the machine learning classifier). Indeed, during their experiments (e.g., using a "testing" dataset and a separate "production" dataset), the present inventors implemented an embodiment described herein: after initial training, the machine learning classifier exhibited a recall rate of 32%, a precision rate of 29%, and an area-under-curve score of 0.78; however, after deletion of weakly-predictive feature categories and retraining, the machine learning classifier exhibited a recall rate of 96%, a precision rate of 49%, and an area-under-curve score of 0.99. Clearly, various embodiments described herein constitute concrete and tangible technical improvements in the field of machine learning classification, and thus such embodiments certainly qualify as useful and practical applications of computers.

Furthermore, various embodiments of the subject innovation can control real-world tangible devices based on the disclosed teachings. For example, various embodiments of the subject innovation can electronically train, retrain, and/or execute real-world machine learning models (e.g., decision trees, neural networks).

It should be appreciated that the herein figures and description provide non-limiting examples of the subject innovation and are not necessarily drawn to scale.

FIG. 1 illustrates a block diagram of an example, non-limiting system 100 that can facilitate automated training of machine learning classification for patient missed care opportunities or late arrivals in accordance with one or more embodiments described herein. As shown, an automated classifier training system 102 can be electronically integrated, via any suitable wired and/or wireless electronic connections, with a set of annotated data candidates 104 and/or with a machine learning classifier 122.

In various embodiments, the set of annotated data candidates 104 can include any suitable number of data candidates. In various aspects, each data candidate can be considered as a collection of features that respectively corresponds to some ground-truth classification annotation. This is shown in more detail with respect to FIG. 2.

Figure 2:
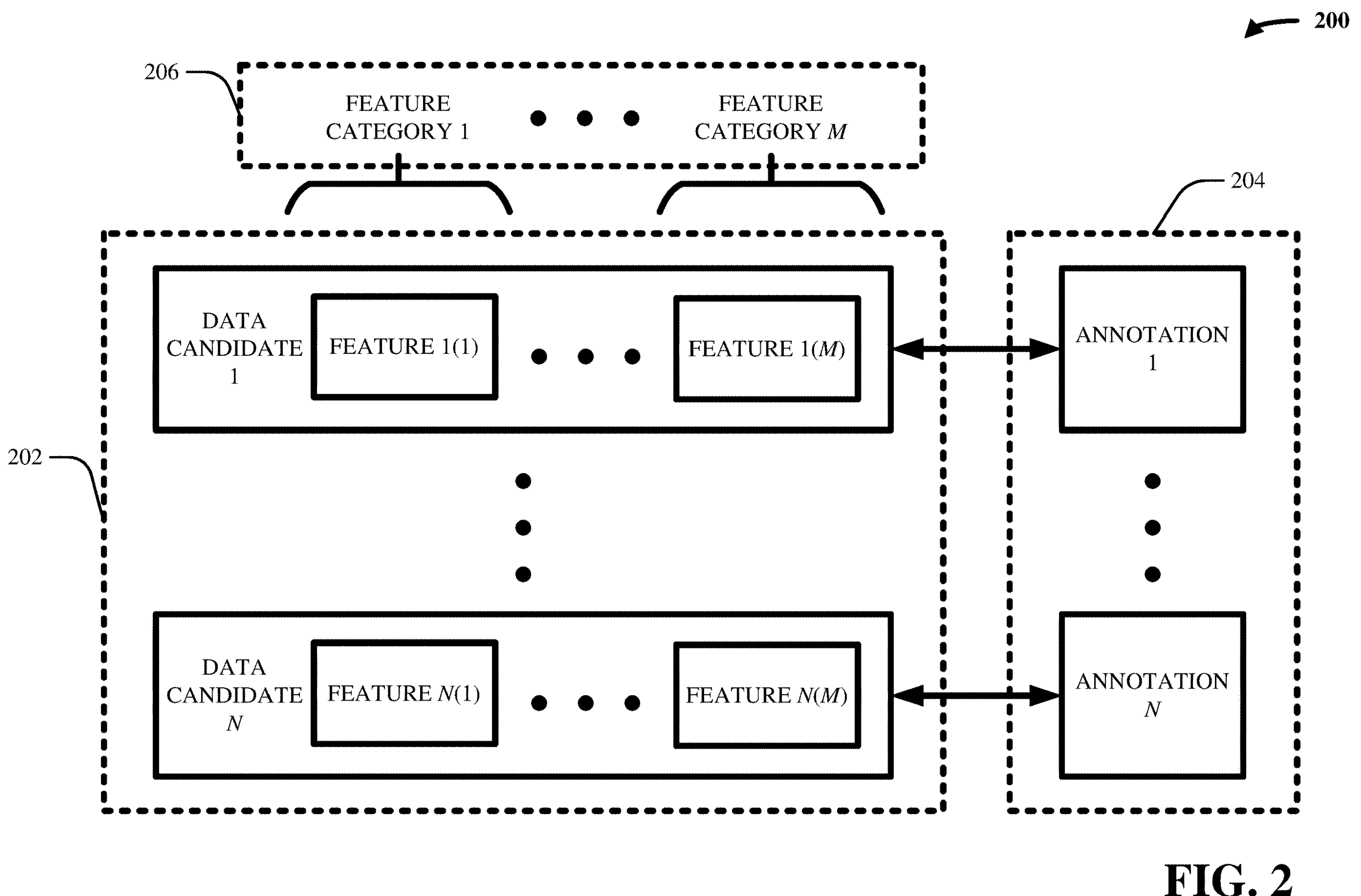
FIG. 2 illustrates an example, non-limiting block diagram of a set of annotated data candidates defined by a set of feature categories in accordance with one or more embodiments described herein.

FIG. 2 illustrates an example, non-limiting block diagram 200 of a set of annotated data candidates defined by a set of feature categories in accordance with one or more embodiments described herein. That is, FIG. 2 shows a non-limiting example embodiment of the set of annotated data candidates 104.

As shown, the set of annotated data candidates 104 can include a set of data candidates 202, a set of annotations 204 that respectively correspond to the set of data candidates 202, and/or a set of feature categories 206 that collectively define the content of each of the set of data candidates 202.

In various aspects, as shown, the set of data candidates 202 can include n candidates for any suitable positive integer n: a data candidate 1 to a data candidate n. In various instances, each of the set of data candidates 202 can represent a different sample of data. As a non-limiting example, each of the set of data candidates 202 can represent a respective medical patient that has a scheduled medical appointment with a medical professional and/or with a healthcare facility.

As shown, each of the set of data candidates 202 can be defined by the set of feature categories 206. In various cases, the set of feature categories 206 can include m categories, for any suitable positive integer m≥2: a feature category 1 to a feature category m. In various instances, a feature category can be any suitable type, kind, class, and/or category of measurable information (e.g., of measurable features and/or attributes) as desired, and a data candidate can be considered as a collection of features/attributes which respectively belong to the set of feature categories 206.

For instance, if each of the set of data candidates 202 represents a respective medical patient that has a scheduled medical appointment with a medical professional and/or with a healthcare facility, then each of the set of feature categories 206 can be some type/kind of measurable characteristic of medical patients that have scheduled medical appointments. For example, a feature category can be an appointment-date category, and a feature/attribute that belongs to such category can be one or more scalars, one or more vectors, one or more matrices, one or more tensors, one or more character strings, and/or any suitable combination thereof that indicate a time and/or date on which a given scheduled medical appointment of a given patient is planned and/or scheduled to take place.

As another example, a feature category can be an allocation-date category, and a feature/attribute that belongs to such category can be one or more scalars, one or more vectors, one or more matrices, one or more tensors, one or more character strings, and/or any suitable combination thereof that indicate a time and/or date on which a given scheduled medical appointment of a given patient was established, set up, penciled in, and/or otherwise allocated in advance.

As still another example, a feature category can be an admission-type category, and a feature/attribute that belongs to such category can be one or more scalars, one or more vectors, one or more matrices, one or more tensors, one or more character strings, and/or any suitable combination thereof that indicate whether a given scheduled medical appointment of a given patient is an outpatient visit or an inpatient visit.

As yet another example, a feature category can be a department category, and a feature/attribute that belongs to such category can be one or more scalars, one or more vectors, one or more matrices, one or more tensors, one or more character strings, and/or any suitable combination thereof that indicate which particular medical department of a healthcare facility is to perform a given scheduled medical appointment of a given patient, such as a radiology department, an endocrinology department, a dermatology department, an audiology department, an obstetrician department, and/or a surgery department.

As even another example, a feature category can be a modality category, and a feature/attribute that belongs to such category can be one or more scalars, one or more vectors, one or more matrices, one or more tensors, one or more character strings, and/or any suitable combination thereof that indicate which particular medical equipment modality is to be used during a given scheduled medical appointment of a given patient, such as a CT scanner, an X-ray scanner, an MRI scanner, an ultrasound scanner, and/or a PET scanner.

As another example, a feature category can be an age category, and a feature/attribute that belongs to such category can be one or more scalars, one or more vectors, one or more matrices, one or more tensors, one or more character strings, and/or any suitable combination thereof that indicate an age and/or birth date of a given patient.

As yet another example, a feature category can be an education category, and a feature/attribute that belongs to such category can be one or more scalars, one or more vectors, one or more matrices, one or more tensors, one or more character strings, and/or any suitable combination thereof that indicate a highest level of education and/or a highest educational degree obtained by a given patient.

As still another example, a feature category can be an employment category, and a feature/attribute that belongs to such category can be one or more scalars, one or more vectors, one or more matrices, one or more tensors, one or more character strings, and/or any suitable combination thereof that indicate an occupation and/or profession of a given patient.

As even another example, a feature category can be a pathology category, and a feature/attribute that belongs to such category can be one or more scalars, one or more vectors, one or more matrices, one or more tensors, one or more character strings, and/or any suitable combination thereof that indicate existing pathologies, diseases, ailments, diagnoses, and/or prognoses of a given patient.

As another example, a feature category can be an ethnicity category, and a feature/attribute that belongs to such category can be one or more scalars, one or more vectors, one or more matrices, one or more tensors, one or more character strings, and/or any suitable combination thereof that indicate an ethnicity, citizenship, and/or national origin of a given patient.

As yet another example, a feature category can be an insurance category, and a feature/attribute that belongs to such category can be one or more scalars, one or more vectors, one or more matrices, one or more tensors, one or more character strings, and/or any suitable combination thereof that indicate whether and/or through what provider a given patient is medically insured.

As still another example, a feature category can be a residence category, and a feature/attribute that belongs to such category can be one or more scalars, one or more vectors, one or more matrices, one or more tensors, one or more character strings, and/or any suitable combination thereof that indicate where a given patient lives in relation to a healthcare facility that is slated to host a scheduled medical appointment of the given patient, and/or that indicate how far the given patient lives from the healthcare facility.

As even another example, a feature category can be a traffic category, and a feature/attribute that belongs to such category can be one or more scalars, one or more vectors, one or more matrices, one or more tensors, one or more character strings, and/or any suitable combination thereof that indicate a forecasted amount of traffic that is expected, during any suitable time window preceding a scheduled medical appointment of a given patient, to accumulate around a residence of the given patient, to accumulate around a healthcare facility that is slated to host the scheduled medical appointment, and/or to accumulate along a route from the residence to the healthcare facility.

As still another example, a feature category can be a weather category, and a feature/attribute that belongs to such category can be one or more scalars, one or more vectors, one or more matrices, one or more tensors, one or more character strings, and/or any suitable combination thereof that indicate a forecasted weather event that is expected, during any suitable time interval preceding a scheduled medical appointment of a given patient, to occur around a residence of the given patient, to occur around a healthcare facility that is slated to host the scheduled medical appointment, and/or to occur along a route from the residence to the healthcare facility.

These are mere non-limiting examples of potential feature categories. Those having ordinary skill in the art will appreciate that, in various instances, any other suitable feature categories can be implemented as desired.

Because the set of feature categories 206 can include m categories, each of the set of data candidates 202 can include m features. For example, the data candidate 1 can include m different features: a feature 1(1) to a feature 1(m), where the feature 1(1) can belong to the feature category 1, and where the feature 1(m) can belong to the feature category m. Similarly, the data candidate n can include m different features: a feature n(1) to a feature n(m), where the feature n(1) can belong to the feature category 1, and where the feature n(m) can belong to the feature category m. So, suppose that the data candidate 1 represents a particular medical patient that has a particular scheduled medical appointment, suppose that the data candidate n represents a different medical patient that has a different scheduled medical appointment, suppose that the feature category 1 is a patient age category, and suppose that the feature category m is an appointment-date category. In such case, the feature 1(1) can be one or more scalars, vectors, matrices, tensors, and/or character strings that indicate an age and/or a birth date of the particular medical patient, the feature 1(m) can be one or more scalars, vectors, matrices, tensors, and/or character strings that indicate a time and/or date on which the particular scheduled medical appointment is planned to take place, the feature n(1) can be one or more scalars, vectors, matrices, tensors, and/or character strings that indicate an age and/or a birth date of the different medical patient, and the feature n(m) can be one or more scalars, vectors, matrices, tensors, and/or character strings that indicate a time and/or date on which the different scheduled medical appointment is planned to take place.

In various aspects, the set of annotations 204 can respectively correspond to the set of data candidates 202. Thus, because the set of data candidates 202 can include n candidates, the set of annotations 204 can include n annotations: an annotation 1 to an annotation n. In various instances, an annotation can be one or more scalars, one or more vectors, one or more matrices, one or more tensors, one or more character strings, and/or any suitable combination thereof that represent and/or indicate a ground-truth classification label that is known and/or otherwise deemed to correspond to a respective data candidate. For example, the data candidate 1 can correspond to the annotation 1, which means that the annotation 1 can be considered as the ground-truth classification label for the data candidate 1. Likewise, the data candidate n can correspond to the annotation n, which means that the annotation n can be considered as the ground-truth classification label for the data candidate n.

In various cases, any suitable classification can be represented by the set of annotations 204. As a non-limiting example, when each of the set of data candidates 202 represents a respective medical patient that has a scheduled medical appointment, the classification that is represented by the set of annotations 204 can be whether a respective medical patient is likely to arrive on time, to arrive late, and/or to arrive not at all to their scheduled medical appointment. In such case, the annotation 1 can indicate whether the medical patient that is represented by the data candidate 1 is likely to show up on time, is likely to show up late, and/or is likely to not show up at all to his/her scheduled medical appointment. Similarly, the annotation n can indicate whether the medical patient that is represented by the data candidate n is likely to show up on time, is likely to show up late, and/or is likely to not show up at all to his/her scheduled medical appointment. In some aspects, if an annotation indicates that a medical patient is likely to show up late to their scheduled medical appointment, the annotation can further indicate an amount of time (e.g., measured in minutes and/or hours) by which the medical patient is likely to be tardy.

As those having ordinary skill in the art will understand, the set of annotated data candidates 104 can, in some cases, be obtained and/or derived from historical data regarding real-world patient visits to real-world healthcare facilities.

Returning to FIG. 1, the machine learning classifier 122 can exhibit any suitable type of artificial intelligence classification architecture as desired. As a non-limiting example, the machine learning classifier 122 can exhibit a decision tree architecture. In such case, the machine learning classifier 122 can include any suitable number and/or arrangement of decision nodes, any suitable decision threshold percentages in such decision nodes, any suitable number and/or arrangement of leaf nodes, and/or any suitable classification threshold percentages in such leaf nodes. As another non-limiting example, the machine learning classifier 122 can exhibit a neural network architecture. In such case, the machine learning classifier 122 can include any suitable number of layers, any suitable numbers of neurons in various layers, any suitable activation functions in various neurons, and/or any suitable interneuron connections. As those having ordinary skill in the art will appreciate, the machine learning classifier 122 can exhibit any other suitable architecture as desired, such as a support vector machine architecture, a linear and/or logistic regression architecture, and/or a naïve Bayes architecture.

In any case, it can be desired to train the machine learning classifier 122 on the set of annotated data candidates 104. As explained herein, the automated classifier training system 102 can facilitate such training.

In various embodiments, the automated classifier training system 102 can comprise a processor 106 (e.g., computer processing unit, microprocessor) and a computer-readable memory 108 that is operably and/or operatively and/or communicatively connected/coupled to the processor 106.

The computer-readable memory 108 can store computer-executable instructions which, upon execution by the processor 106, can cause the processor 106 and/or other components of the automated classifier training system 102 (e.g., receiver component 110, preprocessing component 112, training component 114, validation component 116, feature component 118, execution component 120) to perform one or more acts. In various embodiments, the computer-readable memory 108 can store computer-executable components (e.g., receiver component 110, preprocessing component 112, training component 114, validation component 116, feature component 118, execution component 120), and the processor 106 can execute the computer-executable components.

In various embodiments, the automated classifier training system 102 can comprise a receiver component 110. In various aspects, the receiver component 110 can electronically receive and/or otherwise electronically access the set of annotated data candidates 104 and/or the machine learning classifier 122. In various instances, the receiver component 110 can electronically retrieve the set of annotated data candidates 104 and/or the machine learning classifier 122 from any suitable centralized and/or decentralized data structures (not shown). In any case, the receiver component 110 can electronically obtain the set of annotated data candidates 104 and/or the machine learning classifier 122, so that other components of the automated classifier training system 102 can electronically interact with the annotated data candidates 104 and/or with the machine learning classifier 122.

In various embodiments, the automated classifier training system 102 can comprise a preprocessing component 112. In various aspects, the preprocessing component 112 can electronically apply any suitable formatting changes, any suitable filtration changes, and/or any suitable sorting changes to the set of annotated data candidates 104. As a non-limiting example, in various instances, the preprocessing component 112 can electronically remove, erase, and/or delete from the set of feature categories 206, and thus from the set of annotated data candidates 104, any feature categories that are uniform and/or that otherwise have no variance. For instance, suppose that the feature category i, for any suitable positive integer $1 \leq i \leq m$, exhibits no variance. In other words, the i-th feature of each of the set of data candidates 202 can all be identical (e.g., can all not vary). In such case, the i-th feature can be considered as providing no information that can be used to successfully classify data candidates. Accordingly, the preprocessing component 112 can electronically delete the i-th feature category from the set of feature categories 206 (e.g., can electronically remove and/or eliminate the i-th feature of each of the set of data candidates 202).

As another non-limiting example, in various aspects, the preprocessing component 112 can electronically remove, erase, and/or delete from the set of feature categories 206, and thus from the set of annotated data candidates 104, any feature categories that have significantly many null values and/or not-available values. For instance, suppose that the feature category j, for any suitable positive integer $1 \leq j \leq m$, exhibits more than a threshold proportion of null and/or not-available values. In other words, the ratio of the number of data candidates in the set of data candidates 202 that have a null and/or not-available j-th feature (e.g., the numerator, which can be less than or equal to n) to the total number of data candidates in the set of data candidates 202 (e.g., the denominator, which can be equal to n) can be greater than the threshold proportion. In such case, the j-th feature category can be considered as having too many null and/or not-available values. Accordingly, the preprocessing component 112 can electronically delete the j-th feature category from the set of feature categories 206 (e.g., can electronically remove and/or eliminate the j-th feature of each of the set of data candidates 202).

As still another non-limiting example, in various instances, the preprocessing component 112 can electronically remove, erase, and/or delete from the set of data candidates 202, and thus from the set of annotated data candidates 104, any data candidates that have significantly many null and/or not-available features. For instance, suppose that the k-th data candidate, for any suitable positive integer $1 \leq k \leq n$, exhibits more than a threshold proportion of null and/or not-available features. In other words, the ratio of the number of features in the k-th data candidate that have null and/or not-available values (e.g., the numerator, which can be less than or equal to m) to the total number of features in the k-th data candidate (e.g., the denominator, which can be m) can be greater than the threshold proportion. In such case, the k-th data candidate can be considered as having too many null and/or not-available features. Accordingly, the preprocessing component 112 can electronically delete the k-th data candidate from the set of data candidates 202.

In various embodiments, the automated classifier training system 102 can comprise a training component 114. In various aspects, as described herein, the training component 114 can electronically train the machine learning classifier 122 on the set of annotated data candidates 104.

In various embodiments, the automated classifier training system 102 can comprise a validation component 116. In various instances, as described herein, the validation component 116 can electronically compute one or more performance metrics of the machine learning classifier 122.

In various embodiments, the automated classifier training system 102 can comprise a feature component 118. In various cases, as described herein, the feature component 118 can electronically rank the set of feature categories 206 in order of their classification importance.

In various embodiments, the automated classifier training system 102 can comprise an execution component 120. In various aspects, as described herein, the execution component 120 can electronically perform any suitable electronic actions, based on the set of feature categories 206 being ranked in order of classification importance.

Figure 3:
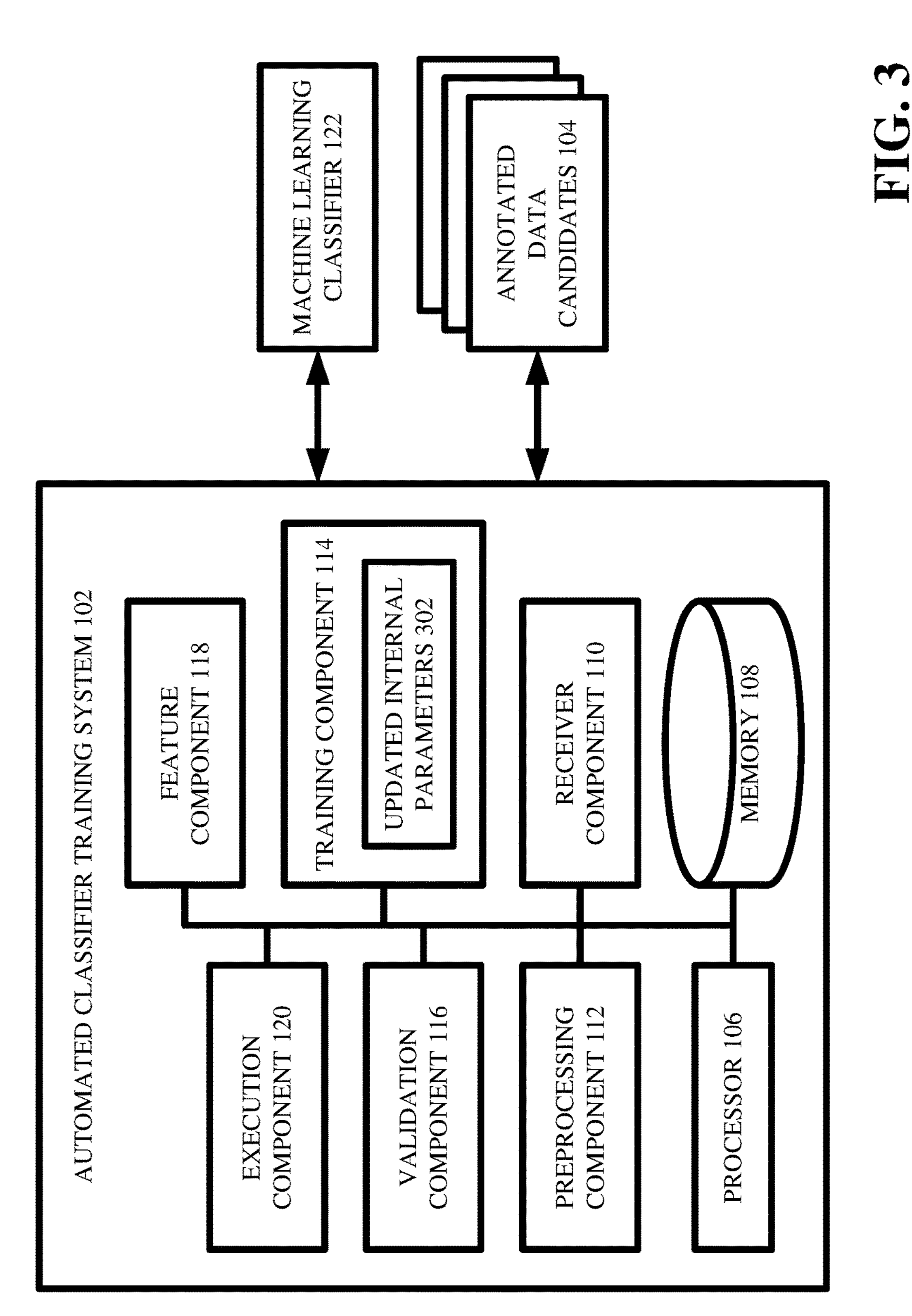
FIG. 3 illustrates a block diagram of an example, non-limiting system including a set of updated internal parameters that facilitates automated training of machine learning classification for patient missed care opportunities or late arrivals in accordance with one or more embodiments described herein.

FIG. 3 illustrates a block diagram of an example, non-limiting system 300 including a set of updated internal parameters that can facilitate automated training of machine learning classification for patient missed care opportunities or late arrivals in accordance with one or more embodiments described herein. As shown, the system 300 can, in some cases, comprise the same components as the system 100, and can further comprise a set of updated internal parameters 302.

In various embodiments, the training component 114 can electronically train the machine learning classifier 122 on the set of annotated data candidates 104 (e.g., after the set of annotated data candidates 104 have been formatted, sorted, and/or filtered by the preprocessing component 112). In various cases, such training can yield the updated internal parameters 302. More specifically, the machine learning classifier 122 can, no matter its particular artificial intelligence architecture, have internal parameters which govern how the machine learning classifier 122 determines and/or infers classifications. For example, if the machine learning classifier 122 exhibits a decision tree architecture, the internal parameters of the machine learning classifier 122 can be considered as the decision node locations, the decision node thresholds, the leaf node locations, and/or the leaf node thresholds of the machine learning classifier 122. As another example, if the machine learning classifier 122 exhibits a neural network architecture, the internal parameters of the machine learning classifier 122 can be considered as the weight matrices and/or bias values of the neurons of the machine learning classifier 122. In any case, the machine learning classifier 122 can have internal parameters, and the internal parameters of the machine learning classifier 122 can become updated and/or optimized via training so that the machine learning classifier 122 can accurately classify inputted data candidates. The updated internal parameters 302 can be considered as the values of the internal parameters of the machine learning classifier 122 after completion of training by the training component 114.

As those having ordinary skill in the art will appreciate, the type of training which the machine learning classifier 122 undergoes can depend upon the artificial intelligence architecture of the machine learning classifier 122.

As a non-limiting example, suppose that the machine learning classifier 122 exhibits a decision tree architecture, such as XGBoost. In such case, the training component 114 can electronically fit the machine learning classifier 122 to the set of annotated data candidates 104 by applying any suitable sample splitting technique. For instance, in some cases, the training component 114 can split the set of annotated data candidates 104 according to annotation based on estimate of positive correctness. In other cases, the training component 114 can split the set of annotated data candidates 104 according to annotation based on Gini impurity. In still other cases, the training component 114 can split the set of annotated data candidates 104 according to annotation based on information gain. In yet other cases, the training component 114 can split the set of annotated data candidates 104 according to annotation based on variance reduction. In even other cases, the training component 114 can split the set of annotated data candidates 104 according to annotation based on measure of "goodness". Furthermore, in various aspects, the training component 114 can perform any suitable pruning technique on the machine learning classifier 122, such as reduced error pruning and/or cost complexity pruning. In any case, the ultimate result can be that the machine learning classifier now has the updated internal parameters 302 (e.g., the ultimate result can be that the decision node locations, decision node thresholds, leaf node locations, and/or leaf node thresholds have been optimized to accurately classify inputted data candidates).

As another non-limiting example, suppose that the machine learning classifier is instead a deep learning neural network. In such case, the training component 114 can train the machine learning classifier 122 on the set of annotated data candidates 104 in supervised fashion. This is shown in more detail with respect to FIG. 4.

Figure 4:
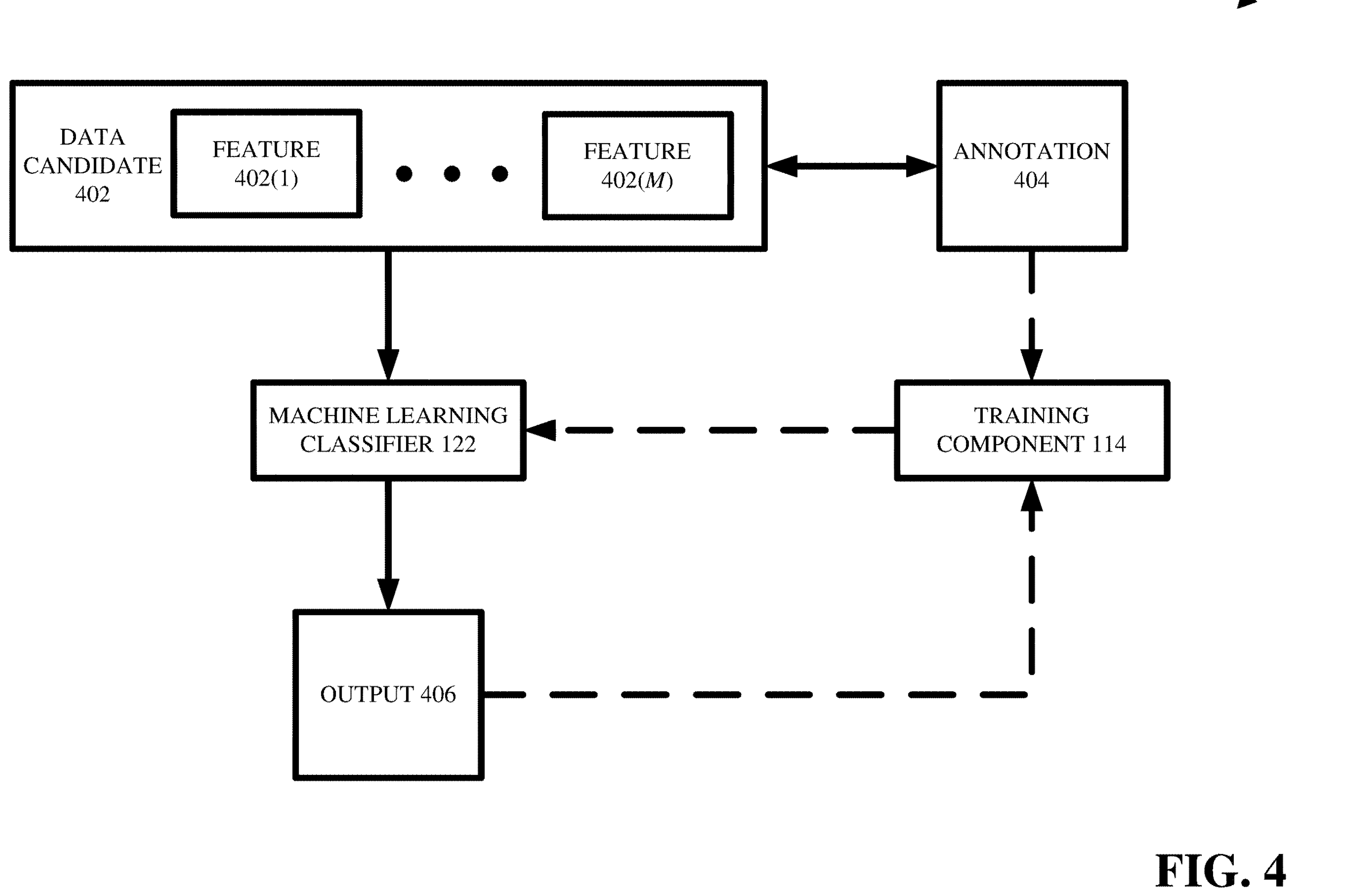
FIG. 4 illustrates an example, non-limiting block diagram showing how a machine learning classifier can be trained in accordance with one or more embodiments described herein.

FIG. 4 illustrates an example, non-limiting block diagram 400 showing how the machine learning classifier 122 can be trained in accordance with one or more embodiments described herein. In various aspects, the training component 114 can randomly initialize (and/or can initialize in any other suitable fashion) the internal parameters (e.g., weights, biases) of the machine learning classifier 122.

In various instances, the training component 114 can select, from the set of annotated data candidates 104, a data candidate 402 (e.g., one of 202) and an annotation 404 (e.g., one of 204) that corresponds to the data candidate 402. As shown, the data candidate 402 can, in various cases, include m features: a feature 402(1) to a feature **402(*m*). In various aspects, the training component 114 can feed the data candidate 402 as input to the machine learning classifier 122, and this can cause the machine learning classifier 122 to generate some output 406. More specifically, in various instances, an input layer of the machine learning classifier 122 can receive the data candidate 402, the data candidate 402 can complete a forward pass through one or more hidden layers of the machine learning classifier 122, and an output layer of the machine learning classifier 122 can compute the output 406 based on activations generated by the one or more hidden layers of the machine learning classifier 122. In various instances, the output 406 can be considered as representing the inferred classification which the machine learning classifier 122 believes should correspond to the data candidate 402. In contrast, the annotation 404 can be considered as representing the ground-truth classification that is known to correspond to the data candidate 402. Note that, if the machine learning classifier 122 has so far undergone no and/or little training, then the output 406 can be highly inaccurate. That is, the output 406 can be very different from the annotation 404. In any case, the training component 114 can calculate an error and/or loss between the output 406 and the annotation 404. In various aspects, the training component 114 can then update the internal parameters of the machine learning classifier 122 by performing backpropagation, where such backpropagation is driven by the calculated error/loss. In various instances, the training component 114 can repeat this training procedure for each (and/or fewer, in some cases) data candidate in the set of annotated data candidates 104. This can ultimately cause the internal parameters of the machine learning classifier 122 to become iteratively optimized to accurately classify inputted data candidates. That is, such training can yield the updated internal parameters 302. Those having ordinary skill in the art will appreciate that any suitable training batch sizes, any suitable training termination criteria, and/or any suitable error/loss functions can be implemented by the training component 114** as desired.

Therefore, the training component 114 can, in various instances, electronically train the machine learning classifier 122 on the set of annotated data candidates 104, thereby yielding the updated internal parameters 302. As those having ordinary skill in the art will appreciate, no matter the particular structure and/or architecture of the machine learning classifier 122, the machine learning classifier 122 can have configurable internal parameters that are updated and/or optimized during training (e.g., node locations and/or node thresholds can be the configurable internal parameters for tree-based models; weight vectors and/or bias values can be the configurable internal parameters for neural networks, scalar coefficients can be the configurable internal parameters for linear and/or logistic regression models).

Figure 5:
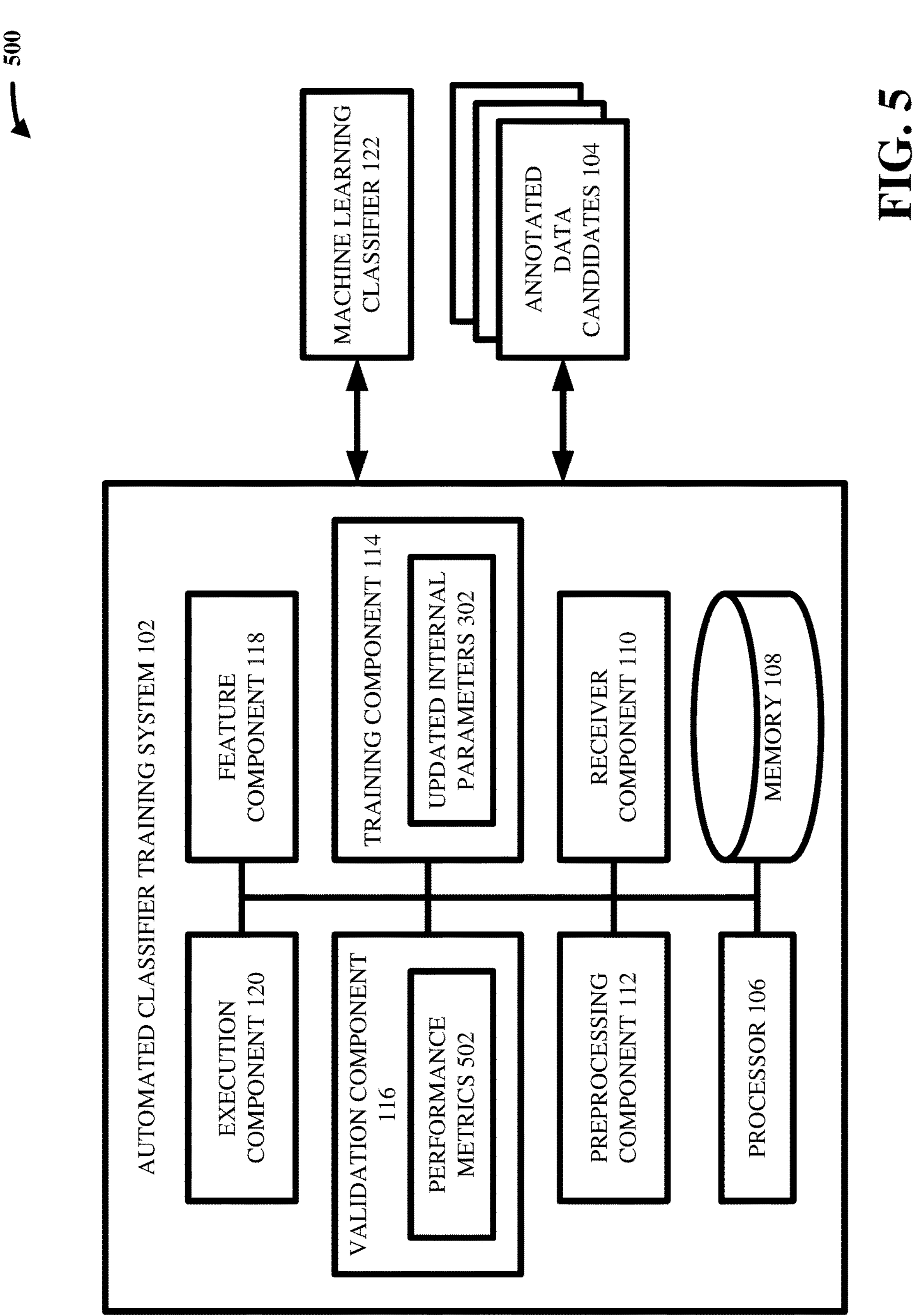
FIG. 5 illustrates a block diagram of an example, non-limiting system including a set of performance metrics that facilitates automated training of machine learning classification for patient missed care opportunities or late arrivals in accordance with one or more embodiments described herein.

FIG. 5 illustrates a block diagram of an example, non-limiting system 500 including a set of performance metrics that can facilitate automated training of machine learning classification for patient missed care opportunities or late arrivals in accordance with one or more embodiments described herein. As shown, the system 500 can, in some cases, comprise the same components as the system 300, and can further comprise a set of performance metrics 502.

In various embodiments, the validation component 116 can electronically compute the set of performance metrics 502 by evaluating the performance of the machine learning classifier 122 after the training component 114 has trained the machine learning classifier 122. For instance, in some aspects, the training component 114 can train the machine learning classifier 122 on all but any suitable subset of the set of annotated data candidates 104. In such case, the validation component 116 can leverage such subset to generate the performance metrics 502. In other words, because such subset can include various data candidates (e.g., some of 202) and corresponding ground-truth annotations (e.g., some of 204), the machine learning classifier 122 can be executed on such various data candidates, and the outputs generated by the machine learning classifier 122 can be compared to the corresponding annotations, so as to quantify the performance of the machine learning classifier 122. As those having ordinary skill in the art will appreciate, the set of performance metrics 502 can include any suitable metrics for quantifying performance of the machine learning classifier 122. For example, the set of performance metrics 502 can include an accuracy score of the machine learning classifier 122. As another example, the set of performance metrics 502 can include a recall score of the machine learning classifier 122. As yet another example, the set of performance metrics 502 can include an area-under-curve score of the machine learning classifier 122. As still another example, the set of performance metrics 502 can include a true-positive score, a false-positive score, a true-negative score, and/or a false-negative score of the machine learning classifier 122.

Figure 6:
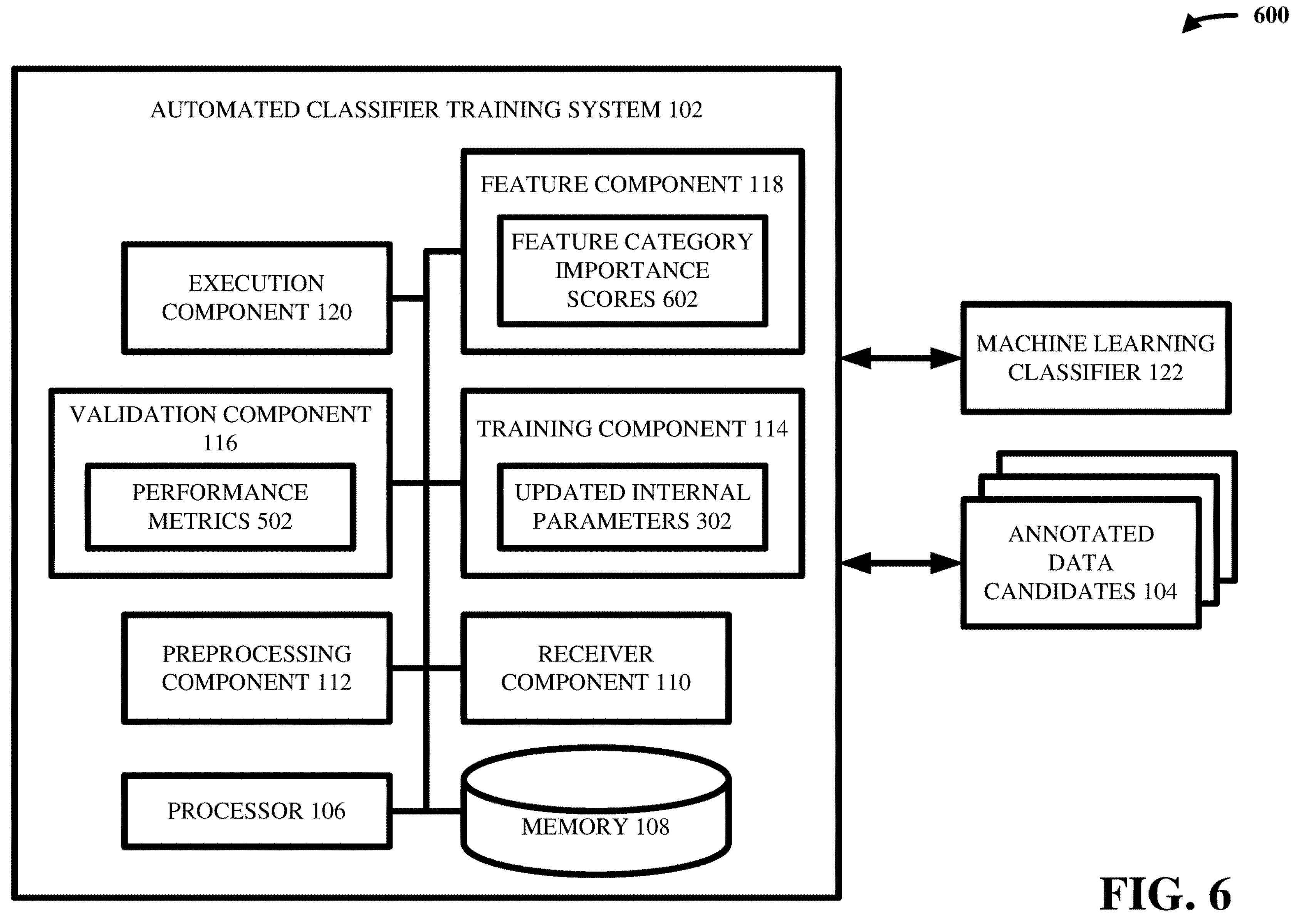
FIG. 6 illustrates a block diagram of an example, non-limiting system including a set of feature category importance scores that facilitates automated training of machine learning classification for patient missed care opportunities or late arrivals in accordance with one or more embodiments described herein.

FIG. 6 illustrates a block diagram of an example, non-limiting system 600 including a set of feature category importance scores that can facilitate automated training of machine learning classification for patient missed care opportunities or late arrivals in accordance with one or more embodiments described herein. As shown, the system 600 can, in some cases, include the same components as the system 500, and can further include a set of feature category importance scores 602.

In various embodiments, the feature component 118 can electronically generate the set of feature category importance scores 602, based on the updated internal parameters 302. In various aspects, the set of feature category importance scores 602 can respectively correspond to the set of feature categories 206. In other words, there can be one importance score per feature category. In various instances, the set of feature category importance scores 602 can be considered as indicating and/or representing how strongly-predictive and/or how weakly-predictive each of the set of feature categories 206 is with respect to the desired classification. This is explained in more detail with respect to FIG. 7

FIG. 7 illustrates an example, non-limiting block diagram 700 showing a set of feature category importance scores in accordance with one or more embodiments described herein. That is, FIG. 7 depicts a non-limiting example embodiment of the set of feature category importance scores 602.

In various embodiments, as shown, the set of feature category importance scores 602 can respectively correspond in one-to-one fashion to the set of feature categories 206. Thus, since the set of feature categories 206 can include m categories, the set of feature category importance scores 602 can include m scores: an importance score 1 to an importance score m. In various aspects, the importance score 1 can correspond to the feature category 1. Accordingly, the importance score 1 can be considered as indicating how predictive, how important, and/or otherwise how correlated the feature category 1 is to the desired classification (e.g., how correlated features/attributes belonging to the feature category 1 are to the desired classification). Likewise, in various instances, the importance score m can correspond to the feature category m. Thus, the importance score m can be considered as indicating how predictive, how important, and/or otherwise how correlated the feature category m is to the desired classification (e.g., how correlated features/attributes belonging to the feature category m are to the desired classification).

In various aspects, an importance score can be a real-valued scalar whose magnitude ranges between any two suitable real-valued numbers. For example, a real-valued importance score can be a scalar whose magnitude ranges between 0 and 1, with 0 indicating a lowest amount of classification importance, with 1 indicating a highest amount of classification importance, and with intermediate decimal values indicating commensurately intermediate amounts of classification importance. In some cases, however, 0 can instead indicate a highest amount of classification importance, and 1 can instead represent a lowest amount of classification importance. Those having ordinary skill in the art will appreciate that any other suitable magnitude range can be implemented (e.g., real-valued importance scores need not be limited only to the range between 0 and 1).

In various other aspects, an importance score can be an integer-valued scalar whose magnitude ranges between 1 and m. In such case, importance scores can be considered as rankings assigned to the set of feature categories 206. For example, in some cases, an integer-valued importance score of 1 can indicate a most important and/or most strongly-predictive feature category among the m total feature categories (e.g., 1 can signify first place among m total feature categories), whereas an integer-valued importance score of m can indicate a least important and/or most weakly-predictive feature category among the m total feature categories (e.g., m can signify last place among m total feature categories). However, in other cases, an integer-valued importance score of 1 can indicate a least important and/or most weakly-predictive feature category among the m total feature categories (e.g., 1 can signify a lowest ranking among m total feature categories), whereas an integer-valued importance score of m can indicate a most important and/or most strongly-predictive feature category among the m total feature categories (e.g., m can signify a highest ranking among m total feature categories).

In any case, the set of feature category importance scores 602 can respectively indicate how relevant and/or important each of the set of feature categories 206 is with respect to the desired classification that the machine learning classifier 122 is trained to perform.

Figure 8:
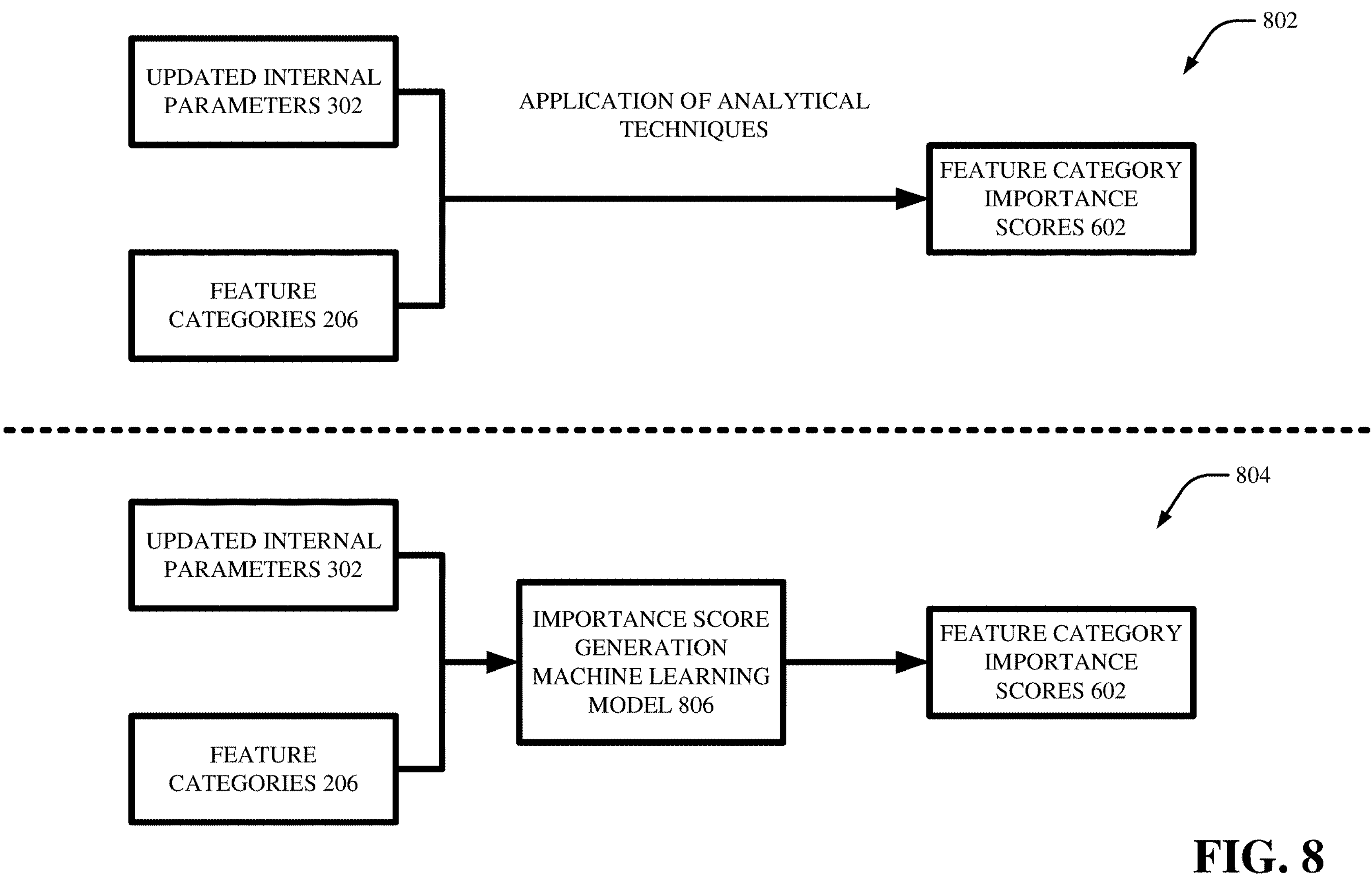
FIG. 8 illustrates an example, non-limiting block diagram showing how a set of feature category importance scores can be generated in accordance with one or more embodiments described herein.

FIG. 8 illustrates an example, non-limiting block diagram showing how a set of feature category importance scores can be generated in accordance with one or more embodiments described herein. In other words, FIG. 8 depicts how the feature component 118 can electronically generate the set of feature category importance scores 602.

As shown, FIG. 8 illustrates two scenarios: a scenario 802 and a scenario 804. As shown in the scenario 802, the feature component 118 can, in various aspects, electronically generate the set of feature category importance scores 602 by applying any suitable analytical technique to the updated internal parameters 302 and/or to the set of feature categories 206.

As a non-limiting example, suppose that the machine learning classifier 122 exhibits a decision tree architecture. In such case, the updated internal parameters 302 can be considered as representing the decision node locations, the decision node threshold percentages, the leaf node locations, and/or the leaf node threshold percentages which the machine learning classifier 122 achieves after completion of training by the training component 114. In various instances, each decision node of the machine learning classifier 122 can be considered as splitting an inputted data candidate according to one of the set of feature categories 206. Accordingly, each decision node of the machine learning classifier 122 can be considered as corresponding to a respective feature category. In various aspects, the feature component 118 can assign importance scores to each feature category, based on the location of the decision node that corresponds to that feature category. For example, a root node of the machine learning classifier 122 can be considered as the splitting an inputted data candidate based on a most important and/or most strongly predictive feature category. Thus, the feature component 118 can assign a best importance score (e.g., a best ranking) to the feature category that corresponds to the root node. Moreover, in various instances, the feature component 118 can assign an importance score to each remaining feature category, based on how far the decision node corresponding to that feature category is located from the root node. For example, suppose that a given decision node is located one level below (e.g., one level away from) the root node in the machine learning classifier 122, and suppose that a different decision node is located two levels below (e.g., two levels away from) the root node in the machine learning classifier 122. In such case, the feature component 118 can assign a better importance score (e.g., a better ranking) to the feature category that corresponds to the given decision node and can assign a worse importance score (e.g., a worse ranking) to the feature category that corresponds to the different decision node. In this way, the feature component 118 can analytically assign importance scores to the set of feature categories 206, based on the updated internal parameters 302 (e.g., based on the post-training decision node locations in the machine learning classifier 122, when the machine learning classifier 122 is a tree-based model).

As another non-limiting example, suppose that the machine learning classifier 122 exhibits a linear and/or logistic regression architecture. In such case, the updated internal parameters 302 can be considered as representing the regression coefficients which the machine learning classifier 122 achieves after completion of training by the training component 114. In various instances, each regression coefficient of the machine learning classifier 122 can be multiplied by (and/or exponentially applied to) a respective feature of an inputted data candidate, and such feature can belong to a respective one of the set of feature categories 206. Accordingly, each regression coefficient of the machine learning classifier 122 can be considered as corresponding to a respective feature category (e.g., a respective one of 206). In various aspects, the feature component 118 can assign importance scores to each feature category, based on the magnitude of the regression coefficient that corresponds to that feature category. For example, a largest regression coefficient of the machine learning classifier 122 can be considered as being multiplied by (and/or exponentially applied to) a most important and/or most strongly-predictive feature of an inputted data candidate. Thus, the feature component 118 can assign a best importance score (e.g., a best ranking) to the feature category that corresponds to the largest regression coefficient. Furthermore, in various instances, the feature component 118 can assign an importance score to each remaining feature category, based on the magnitude of the regression coefficient that corresponds to that feature category. For example, suppose that a first regression coefficient is larger than a second regression coefficient. In such case, the feature component 118 can assign a better importance score (e.g., a better ranking) to the feature category that corresponds to the first regression coefficient and can assign a worse importance score (e.g., a worse ranking) to the feature category that corresponds to the second regression coefficient. In this way, the feature component 118 can analytically assign importance scores to the set of feature categories 206, based on the updated internal parameters 302 (e.g., based on the post-training regression coefficients in the machine learning classifier 122, when the machine learning classifier 122 is a regression-based model).

In various aspects, analytical techniques for assigning/computing the set of feature category importance scores 602, such as those described in the preceding two paragraphs, can be useful when the updated internal parameters 302 are easily interpretable, as can be the case for decision-tree architectures and/or linear/logistic regression architectures. However, in some instances, the updated internal parameters 302 can be more complicated and/or less easily interpretable. Indeed, such can be the case when the machine learning classifier 122 is a deep learning neural network (e.g., a deep learning neural network can have hundreds and/or thousands of internal weight values and/or bias values). In such case, the scenario 804 can be implemented.

As shown in the scenario 804, the feature component 118 can, in various aspects, electronically generate the set of feature category importance scores 602 by executing an importance score generation machine learning model 806 on the updated internal parameters 302 and/or on the set of feature categories 206. In such instances, the feature component 118 can be considered as electronically storing, electronically maintaining, electronically controlling, and/or otherwise electronically accessing the importance score generation machine learning model 806. In various aspects, the importance score generation machine learning model 806 can exhibit any suitable artificial intelligence architecture as desired. For example, the importance score generation machine learning model 806 can exhibit a deep learning neural network architecture. In such case, the importance score generation machine learning model 806 can have any suitable number of layers (e.g., input layer, one or more hidden layers, output layer), any suitable numbers of neurons in various layers (e.g., different layers can have the same and/or different numbers of neurons as each other), any suitable activation functions (e.g., sigmoid, softmax, hyperbolic tangent, rectified linear unit) in various neurons (e.g., different neurons can have the same and/or different activation functions as each other), and/or any suitable interneuron connections (e.g., forward connections, recurrent connections, skip connections).

In any case, the importance score generation machine learning model 806 can be configured to receive as input the updated internal parameters 302 and/or the set of feature categories 206, and the importance score generation machine learning model 806 can be further configured to produce as output the set of feature category importance scores 602. More specifically, the updated internal parameters 302 can be represented by one or more first scalars, vectors, matrices, tensors, and/or character strings. Likewise, the set of feature categories 206 can be represented by one or more second scalars, vectors, matrices, tensors, and/or character strings. Accordingly, in various instances, the first scalars, vectors, matrices, tensors, and/or character strings can be concatenated with the second scalars, vectors, matrices, tensors, and/or character strings, an input layer of the importance score generation machine learning model 806 can receive such concatenation, such concatenation can complete a forward pass through one or more hidden layers of the importance score generation machine learning model 806, and/or an output layer of the importance score generation machine learning model 806 can compute the set of feature category importance scores 602 based on activations produced by the one or more hidden layers of the importance score generation machine learning model 806.

In order for the importance score generation machine learning model 806 to accurately perform its above-described functionality, it should first be trained. In various cases, such training can be implemented as described with respect to FIGS. 9-11.

Figure 9:
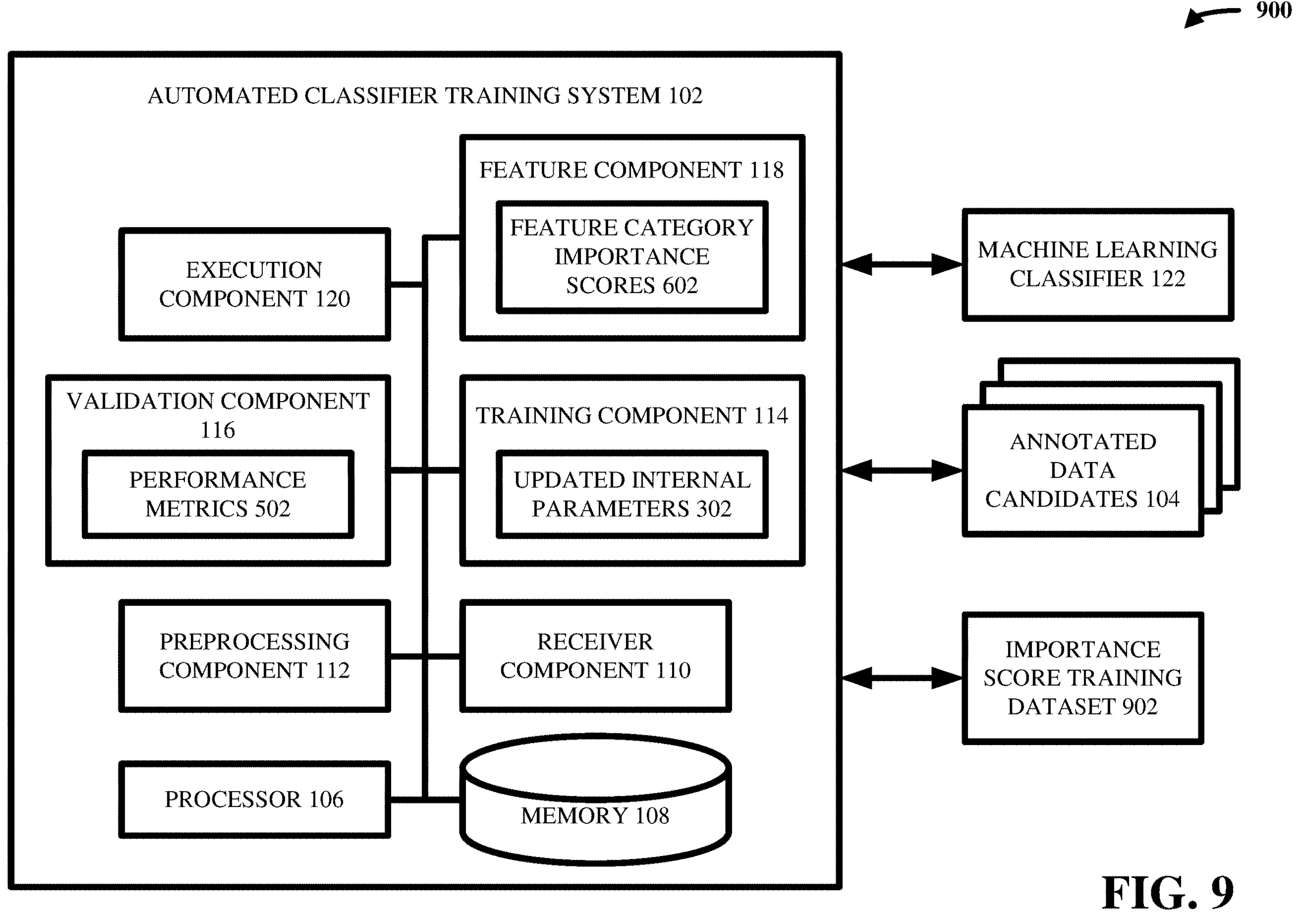
FIG. 9 illustrates a block diagram of an example, non-limiting system including an importance score training dataset that facilitates automated training of machine learning classification for patient missed care opportunities or late arrivals in accordance with one or more embodiments described herein.

FIG. 9 illustrates a block diagram of an example, non-limiting system 900 including an importance score training dataset that can facilitate automated training of machine learning classification for patient missed care opportunities or late arrivals in accordance with one or more embodiments described herein. As shown, the system 900 can, in various cases, comprise the same components as the system 600, and can further comprise an importance score training dataset 902.

In various aspects, the receiver component 110 can electronically receive, retrieve, obtain, and/or otherwise access, from any suitable source, the importance score training dataset 902, and the training component 114 can electronically train the importance score generation machine learning model 806 on the importance score training dataset 902. This is further described with respect to FIGS. 10-11.

Figure 10:
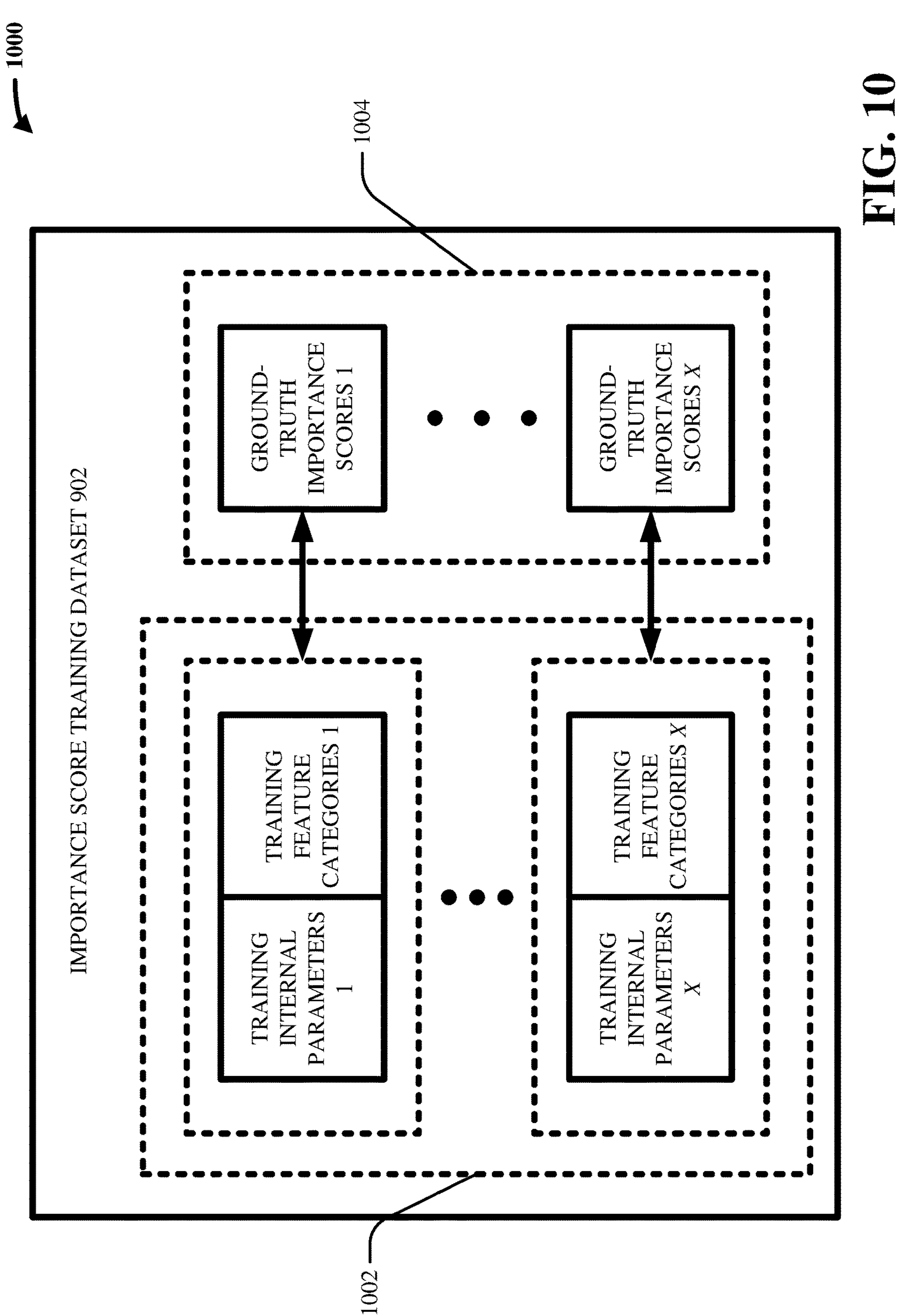
FIG. 10 illustrates an example, non-limiting block diagram showing an importance score training dataset in accordance with one or more embodiments described herein.

FIG. 10 illustrates an example, non-limiting block diagram 1000 showing an importance score training dataset in accordance with one or more embodiments described herein. That is, FIG. 10 depicts a non-limiting example embodiment of the importance score training dataset 902.

In various embodiments, as shown, the importance score training dataset 902 can include a set of training concatenations 1002 and/or a set of ground-truth importance scores 1004. In various aspects, the set of training concatenations 1002 can include x concatenations for any suitable positive integer x: a first training concatenation to an x-th training concatenation. Moreover, in various instances, each of the set of training concatenations can include training internal parameters that are concatenated with a set of training feature categories. For example, the first training concatenation can include training internal parameters 1 that are concatenated with a set of training feature categories 1. In various cases, the training internal parameters 1 can have the same data format and/or data dimensionality as the updated internal parameters 302, and/or the set of training feature categories 1 can have the same data format and/or data dimensionality as the set of feature categories 206. Similarly, the x-th training concatenation can include training internal parameters x that are concatenated with a set of training feature categories x. As above, the training internal parameters x can have the same data format and/or data dimensionality as the updated internal parameters 302, and/or the set of training feature categories x can have the same data format and/or data dimensionality as the set of feature categories 206.

In various aspects, as shown, the set of ground-truth importance scores 1004 can respectively correspond to the set of training concatenations 1002. Thus, since the set of training concatenations 1002 can have x concatenations, the set of ground-truth importance scores 1004 can have x sets of importance scores: a set of ground-truth importance scores 1 to a set of ground-truth importance scores x. In various instances, the set of ground-truth importance scores 1 can have the same data format and/or data dimensionality as the set of feature category importance scores 602. Furthermore, in various cases, the set of ground-truth importance scores 1 can correspond to the first training concatenation. In other words, the set of ground-truth importance scores 1 can be considered as the accurate/correct importance scores (e.g., the accurate/correct rankings) that are known and/or deemed to be assigned to the set of training feature categories 1 when given the training internal parameters 1. Similarly, in various aspects, the set of ground-truth importance scores x can have the same data format and/or data dimensionality as the set of feature category importance scores 602. Moreover, in various instances, the set of ground-truth importance scores x can correspond to the x-th training concatenation. That is, the set of ground-truth importance scores x can be considered as the accurate/correct importance scores (e.g., the accurate/correct rankings) that are known and/or deemed to be assigned to the set of training feature categories x when given the training internal parameters x.

Figure 11:
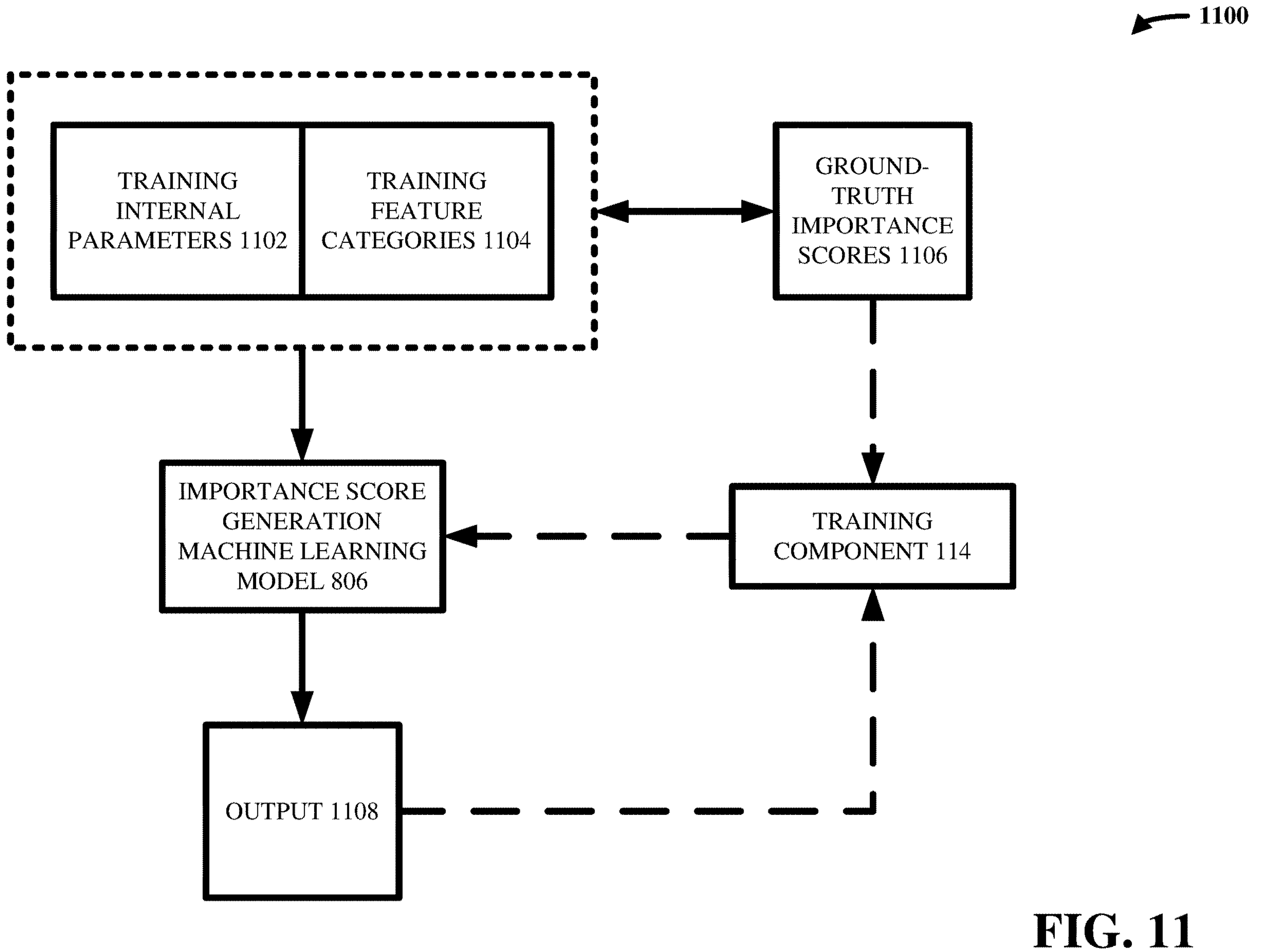
FIG. 11 illustrates an example, non-limiting block diagram showing how an importance score generation machine learning model can be trained on an importance score training dataset in accordance with one or more embodiments described herein.

FIG. 11 illustrates an example, non-limiting block diagram 1100 showing how an importance-score generation machine learning model can be trained on an importance score training dataset in accordance with one or more embodiments described herein. That is, FIG. 11 shows how the importance score generation machine learning model 806 can be trained on the importance score training dataset 902.

In various embodiments, the internal parameters (e.g., weights, biases) of the importance score generation machine learning model 806 can be randomly initialized. In various aspects, the training component 114 can select any suitable concatenation from the importance score training dataset 902. As shown in FIG. 11, the selected concatenation can include training internal parameters 1102 and/or a set of training feature categories 1104. Moreover, the training component 114 can identify, in the importance score training dataset 902, a set of ground-truth importance scores 1106 that correspond to the selected concatenation.

In various instances, the training component 114 can feed the selected concatenation to the importance score generation machine learning model 806, which can cause the importance score generation machine learning model 806 to produce some output 1108. In particular, the training internal parameters 1102 and the set of training feature categories 1104 can be concatenated together, an input layer of the importance score generation machine learning model 806 can receive such concatenation, such concatenation can complete a forward pass through one or more hidden layers of the importance score generation machine learning model 806, and an output layer of the importance score generation machine learning model 806 can compute the output 1108 based on activations generated by the one or more hidden layers of the importance score generation machine learning model 806. In various cases, the output 1108 can be considered as representing the set of importance scores that the importance score generation machine learning model 806 believes should correspond to the set of training feature categories 1104 when given the training internal parameters 1102. In contrast, the set of ground-truth importance scores 1106 can be considered as representing the importance scores and/or rankings that are known and/or deemed to correspond to the set of training feature categories 1104 when given the training internal parameters 1102. Note that, if the importance score generation machine learning model 806 has so far undergone no and/or little training, then the output 1108 can be highly inaccurate (e.g., the output 1108 can be very different from the set of ground-truth importance scores 1106).

In any case, the training component 114 can compute an error/loss (e.g., Euclidean distance, cross entropy) between the output 1108 and/or the set of ground-truth importance scores 1106. Accordingly, the training component 114 can update the internal parameters (e.g., weights, biases) of the importance score generation machine learning model 806 by performing backpropagation, where such backpropagation is driven by the computed error and/or loss.

In various aspects, the training component 114 can repeat this training procedure for each of the training concatenations in the importance score training dataset 902, with the ultimate result being that the internal parameters of the importance score generation machine learning model 806 can become iteratively optimized for accurately inferring importance scores from inputted concatenations. As those having ordinary skill in the art will appreciate, any suitable training batch sizes, any suitable training termination criteria, and/or any suitable error, loss, and/or objective function can be implemented.

Furthermore, those having ordinary skill in the art will appreciate that the "internal parameters" that are being updated during the training that is discussed with respect to FIGS. 9-11 belong to the importance score generation machine learning model 806 and do not belong to the machine learning classifier 122. Instead, the training of the machine learning classifier 122 was described with respect to FIG. 4.

In any case, the feature component 118 can electronically generate the set of feature category importance scores 602, based on the updated internal parameters 302.

Figure 12:
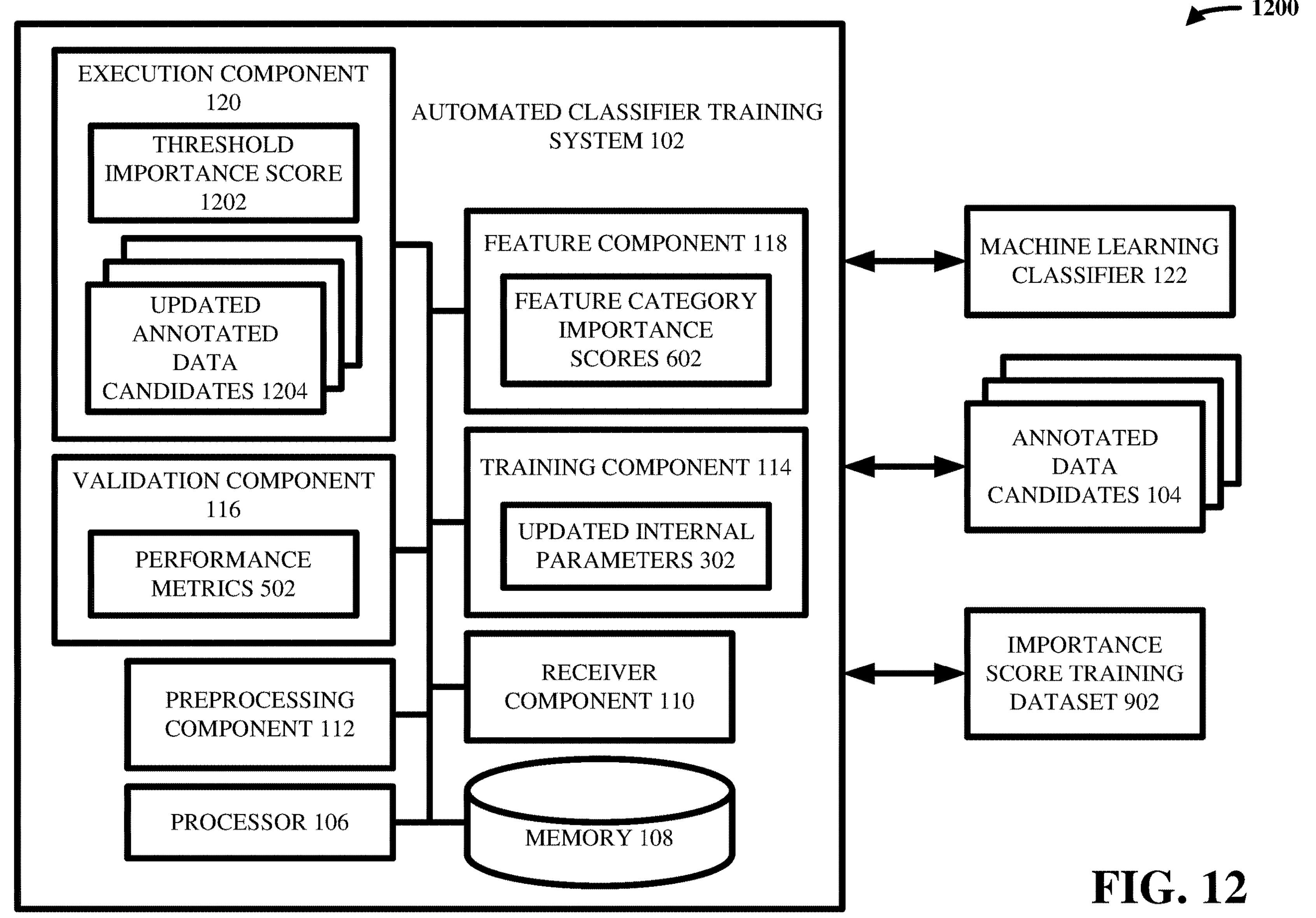
FIG. 12 illustrates a block diagram of an example, non-limiting system including a threshold importance score and a set of updated annotated data candidates that facilitates automated training of machine learning classification for patient missed care opportunities or late arrivals in accordance with one or more embodiments described herein.

FIG. 12 illustrates a block diagram of an example, non-limiting system 1200 including a threshold importance score and a set of updated annotated data candidates that can facilitate automated training of machine learning classification for patient missed care opportunities or late arrivals in accordance with one or more embodiments described herein. As shown, the system 1200 can, in some cases, comprise the same components as the system 900, and can further comprise a threshold importance score 1202 and/or a set of updated annotated data candidates 1204.

In various embodiments, the execution component 120 can electronically facilitate any suitable electronic actions based on the set of feature category importance scores 602. For example, in some cases, the execution component 120 can electronically transmit any of the set of feature category importance scores 602 to any suitable computing device (not shown). As another example, in some cases, the execution component 120 can electronically render, on any suitable computer screen/monitor (not shown), any of the set of feature category importance scores 602.

In some aspects, however, the execution component 120 can electronically store, maintain, and/or otherwise access a threshold importance score 1202. In various instances, the threshold importance score 1202 can be considered as marking the delineation that separates sufficiently important and/or sufficiently predictive feature categories from insufficiently important and/or insufficiently predictive feature categories. As those having ordinary skill in the art will appreciate, the magnitude of the threshold importance score 1202 can be any suitable value as desired. In any case, the execution component 120 can compare the set of feature category importance scores 602 with the threshold importance score 1202. If any importance score from the set of feature category importance scores 602 fails to satisfy the threshold importance score 1202, the feature category (e.g., one of 206) that corresponds to that importance score can be considered as being too irrelevant and/or too weakly-predictive with respect to the desired classification which the machine learning classifier 122 is trained/configured to perform. In various aspects, if the execution component 120 identifies one or more feature categories that are too irrelevant and/or too weakly-predictive, the execution component 120 can electronically delete, erase, remove, and/or otherwise eliminate such one or more feature categories from the set of feature categories 206, and thus from the set of annotated data candidates 104. In various cases, the version of the set of annotated data candidates 104 that results from such deletion, erasure, removal, and/or elimination can be considered as the set of updated annotated data candidates 1204.

Figure 13:
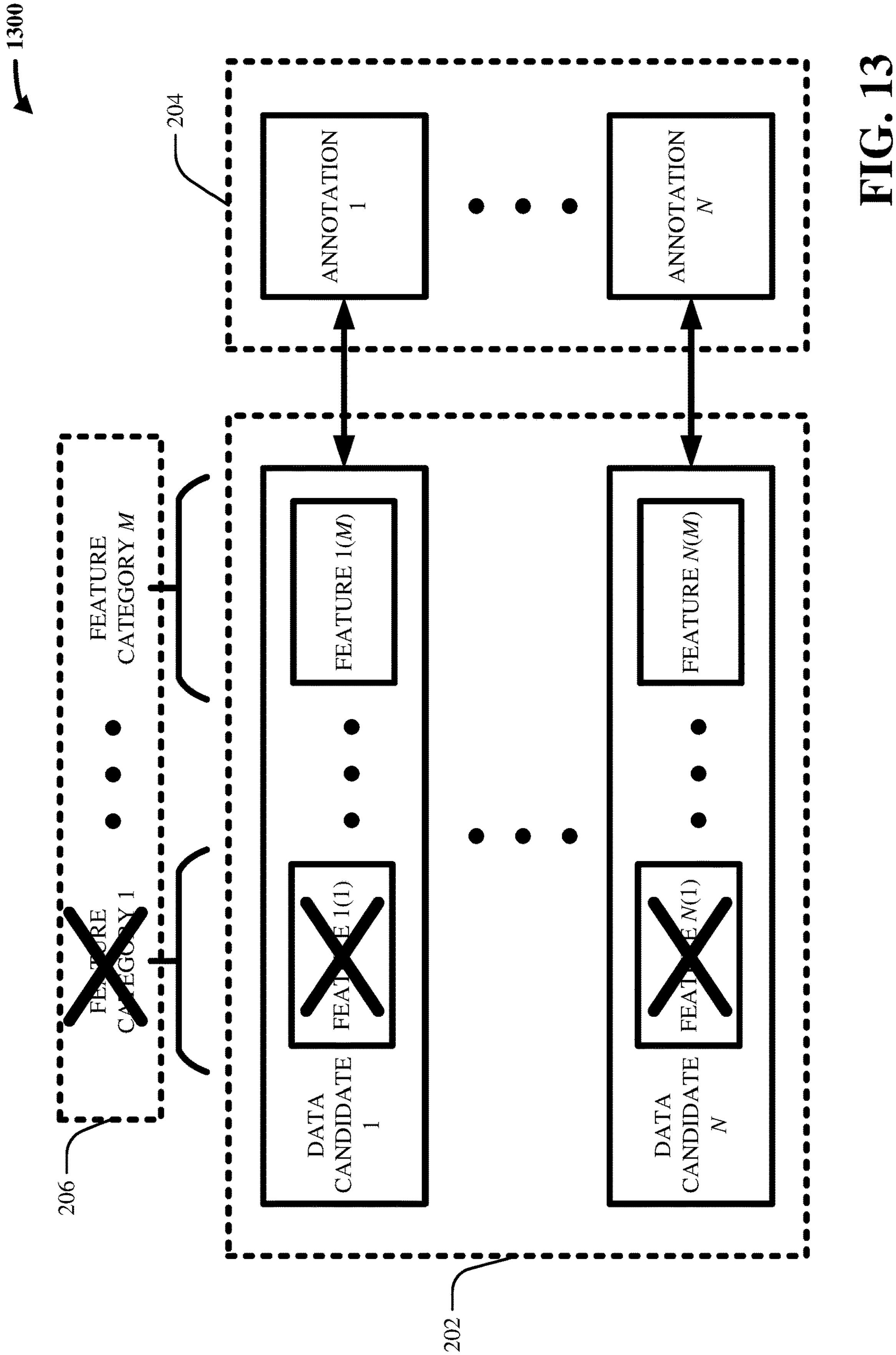
FIG. 13 illustrates an example, non-limiting block diagram of a set of updated annotated data candidates in accordance with one or more embodiments described herein.

FIG. 13 illustrates an example, non-limiting block diagram 1300 of a set of updated annotated data candidates in accordance with one or more embodiments described herein. In other words, FIG. 13 depicts a non-limiting example embodiment of the set of updated annotated data candidates 1204.

In the non-limiting example of FIG. 13, the execution component 120 can determine that the importance score 1, which corresponds to the feature category 1, fails to satisfy the threshold importance score 1202. Thus, it can be inferred and/or concluded that the feature category 1 is not sufficiently important to and/or is not sufficiently predictive of the desired classification which the machine learning classifier 122 is configured to perform. In such case, the execution component 120 can delete and/or remove the feature category 1 from the set of feature categories 206. In other words, the execution component 120 can delete and/or remove the first feature from each data candidate in the set of data candidates 202, as marked by the bold X's in FIG. 13. Therefore, after such deletion/removal, the set of feature categories 206 can be considered as including m−1 feature categories in total, rather than m feature categories in total (e.g., each data candidates in the set of data candidates 202 can be considered as now having m−1 features in total, rather than m features in total).

More generally, if the execution component 120 determines that the i-th importance score of the set of feature category importance scores 602 fails to satisfy the threshold importance score 1202, then the execution component 120 can delete/remove the i-th feature category from the set of feature categories 206 (e.g., can delete/remove the i-th feature from each of the data candidates in the set of data candidates 202).

In various aspects, once the execution component 120 generates the set of updated annotated data candidates 1204, the training component 114 can reconfigure and/or retrain the machine learning classifier 122 on the set of updated annotated data candidates 1204. As experimentally verified by the present inventors, retraining the machine learning classifier 122 after irrelevant and/or weakly-predictive feature categories are deleted/removed can significantly increase the performance (e.g., accuracy, recall, area-under-curve) exhibited by the machine learning classifier 122. Indeed, the present inventors experimentally implemented an embodiment described herein. After initial training but prior to retraining, the machine learning classifier 122 exhibited a recall rate of 32%, a precision rate of 29%, and an area-under-curve score of 0.78. However, after retraining on the training dataset once the weakly-predictive feature categories were deleted from the training dataset, the machine learning classifier 122 exhibited a recall rate of 96%, a precision rate of 49%, and an area-under-curve score of 0.99. This is certainly a concrete and tangible technical improvement.

In various embodiments, after retraining has been completed, the execution component 120 can electronically deploy the machine learning classifier 122 in any suitable operational context as desired (e.g., can execute the machine learning classifier 122 on any suitable data candidate that is encountered in the field).

FIG. 14 illustrates a flow diagram of an example, non-limiting computer-implemented method 1400 that can facilitate automated training of machine learning classification for patient missed care opportunities or late arrivals in accordance with one or more embodiments described herein. In various cases, the automated classifier training system 102 can facilitate the computer-implemented method 1400.

In various embodiments, act 1402 can include accessing, by a device (e.g., via 110) operatively coupled to a processor, a set of annotated data candidates (e.g., 104) defined by two or more feature categories (e.g., 206).

In various aspects, act 1404 can include training, by the device (e.g., via 114), a machine learning classifier (e.g., 122) on the set of annotated data candidates, thereby causing internal parameters of the machine learning classifier to become iteratively updated (e.g., thereby yielding 302).

In various instances, act 1406 can include ranking, by the device (e.g., via 118), the two or more feature categories in order of classification importance (e.g., 602 can be considered as representing and/or conveying such rankings), based on the iteratively updated internal parameters of the machine learning classifier.

In various cases, act 1408 can include performing, by the device (e.g., via 120), one or more electronic actions based on the two or more feature categories being ranked in order of classification importance.

Although not explicitly shown in FIG. 14, the machine learning classifier can be an XGBoost model, and the internal parameters can include decision tree thresholds of the XGBoost model or decision tree locations of the XGBoost model.

Although not explicitly shown in FIG. 14, the one or more electronic actions can include visually rendering, by the device (e.g., via 120) and on an electronic display, rankings (e.g., 602) of the two or more feature categories.

Although not explicitly shown in FIG. 14, the one or more electronic actions can include visually rendering, by the device (e.g., via 120) and on an electronic display, an indication of which of the two or more feature categories are ranked below a threshold value (e.g., 1202).

Although not explicitly shown in FIG. 14, the one or more electronic actions can include: identifying, by the device (e.g., via 120), which of the two or more feature categories are ranked below a threshold value (e.g., 1202); deleting, by the device (e.g., via 120), such feature categories from the set of annotated data candidates, thereby yielding an updated set of annotated data candidates (e.g., 1204); and retraining, by the device (e.g., via 114), the machine learning classifier based on the updated set of annotated data candidates.

Although not explicitly shown in FIG. 14, the machine learning classifier can be configured to receive as input a data candidate that is associated with a medical patient that has a scheduled medical appointment, the machine learning classifier can be configured to produce as output a classification label based on the data candidate, and the classification label can indicate whether the medical patient is likely to not show up for the scheduled medical appointment.

Although not explicitly shown in FIG. 14, the machine learning classifier can be configured to receive as input a data candidate that is associated with a medical patient that has a scheduled medical appointment, the machine learning classifier can be configured to produce as output a classification label based on the data candidate, and the classification label can indicate whether the medical patient is likely to arrive late to the scheduled medical appointment.

Although not explicitly shown in FIG. 14, each of the set of annotated data candidates can pertain to a respectively corresponding medical patient that has a respectively corresponding scheduled medical appointment, and the two or more feature categories can include a patient demographics feature category, a patient medical record feature category, a weather feature category, and/or a traffic feature category.

Accordingly, various embodiments described herein include a computerized tool that can automatically train a machine learning classifier on a set of data candidates defined by a set of feature categories, that can rank the set of feature categories based on optimized/updated internal parameters which the machine learning classifier achieves after training, that can eliminate weakly-predictive feature categories from the set of data candidates, and/or that can retrain the machine learning classifier on the set of data candidates after the weakly-predictive feature categories have been removed. Such a computerized tool can significantly improve the accuracy, precision, and/or recall of the machine learning classifier. Thus, such a computerized tool certainly constitutes a useful and practical application of computers.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 15:
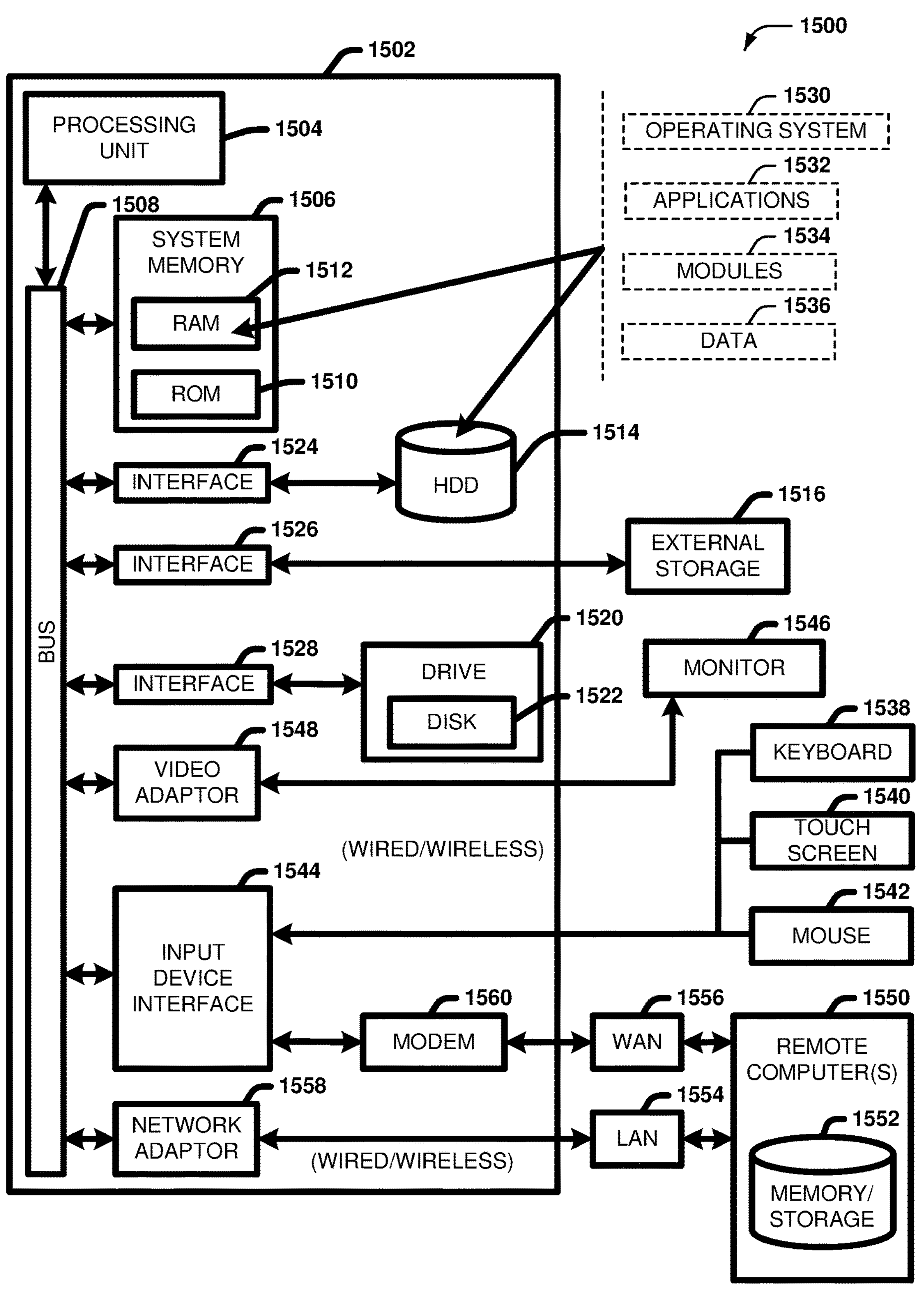
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN

1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 16 is a schematic block diagram of a sample computing environment 1600 with which the disclosed subject matter can interact. The sample computing environment 1600 includes one or more client(s) 1610. The client(s) 1610 can be hardware and/or software (e.g., threads, processes, computing devices). The sample computing environment 1600 also includes one or more server(s) 1630. The server(s) 1630 can also be hardware and/or software (e.g., threads, processes, computing devices). The servers 1630 can house threads to perform transformations by employing one or more embodiments as described herein, for example. One possible communication between a client 1610 and a server 1630 can be in the form of a data packet adapted to be transmitted between two or more computer processes. The sample computing environment 1600 includes a communication framework 1650 that can be employed to facilitate communications between the client(s) 1610 and the server(s) 1630. The client(s) 1610 are operably connected to one or more client data store(s) 1620 that can be employed to store information local to the client(s) 1610. Similarly, the server(s) 1630 are operably connected to one or more server data store(s) 1640 that can be employed to store information local to the servers 1630.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a computer-readable memory, the computer-executable components comprising:

a receiver component that accesses a first set of annotated data candidates defined by a plurality of feature categories, wherein the annotated data candidates respectively pertain to medical patients that have scheduled medical appointments;

a training component that trains a machine learning classifier using a first training process on first feature vectors extracted from the first set to produce as output for each annotated data candidate, a classification label regarding attendance of the scheduled medical appointments of among three classification labels, thereby causing internal parameters of the machine learning classifier to become iteratively updated during the first training process, wherein the three classification labels include an on time arrival label, a late arrival label and a no arrival label;

a feature component that extracts numerical representations of the internal parameters of the machine learning classifier after completion of the first training process, provides the numerical representations as input to an importance score generation machine learning model, and executes the importance score generation machine learning model to generate respective importance scores for the feature categories; and an execution component that identifies respective feature categories of the plurality of feature categories having importance scores that fail to satisfy a threshold value and removes the respective feature categories from the first set, thereby yielding a second set of annotated data candidates, and wherein the training component retrains the machine learning classifier using a second training process on second feature vectors extracted from the second set, thereby generating an optimized version of the machine learning classifier, wherein the second feature vectors having a reduced feature vector dimensionality relative to the first feature vectors.

2. The system of claim 1, wherein the machine learning classifier is an XGBoost model, and wherein the internal parameters include decision tree thresholds of the XGBoost model or decision tree locations of the XGBoost model.

3. The system of claim 1, wherein the feature categories include a patient demographics feature category, a patient medical record feature category, a weather feature category, and a traffic feature category.

4. The system of claim 1, wherein feature categories included in the second set comprise:

an appointment-date category, an allocation-date category, an admission-type category, a department category, a modality category, an age category, an education category, an employment category, a pathology category, an ethnicity category, an insurance category, a residence category, a traffic category, and a weather category.

5. The system of claim 1, wherein the plurality of feature categories corresponds to a filtered set of feature categories generated from an initial set of feature categories associated with the first set of annotated data candidates, and wherein the computer-executable components further comprise:

a preprocessing component that removes one or more initial feature categories from the initial set to generate the filtered set of feature categories, wherein the preprocessing component removes the one or more initial feature categories based on at least one of: a first determination that the one or more initial feature categories exhibit a variance level below a threshold variance level across the set of annotated data candidates, or a second determination that a threshold proportion of the set of annotated data candidates includes a null or unavailable value for the one or more initial features.

6. The system of claim 1, wherein the machine learning classifier is a first neural network model comprising one or more softmax functions, and wherein the internal parameters include weight matrices of neurons of the first neural network model.

7. The system of claim 1, wherein the machine learning classifier comprises a logistic regression architecture, and wherein the internal parameters include regression coefficients.

8. The system of claim 1, the computer-executable components comprising:

a validation component that determines one or more performance metrics for the machine learning classifier after the retraining, compares the one or more performance metrics to a predefined performance threshold, and in response to the one or more performance metrics failing to satisfy the predefined performance threshold, directs the feature component to determine updated importance scores and directs the training component to again retrain the machine learning classifier using a further updated set of annotated data candidates determined by the execution component until the one or more performance metrics satisfy the predefined performance threshold.

9. The system of claim 1, the computer-executable components comprising:

a validation component that determines one or more performance metrics of the machine learning classifier after the completion of the first training process, and wherein the execution component initiates removal of the respective feature categories and retraining in the second training process based on the one or more performance metrics failing to satisfy a performance threshold.

10. The system of claim 1, wherein the machine learning classifier comprises a neural network architecture having weight matrices and bias values as the internal parameters, and wherein the numerical representations comprise one or more scalars, vectors, matrices, or tensors representing the weight matrices and bias values.

11. The system of claim 1, wherein the machine learning classifier comprises a decision tree architecture including decision nodes and leaf nodes, and wherein the importance scores are generated based at least in part on relative locations of decision nodes within the decision tree architecture.

12. The system of claim 1, wherein, after retraining in the second training process, the execution component electronically deploys the optimized version of the machine learning classifier to classify newly encountered data candidates in an operational healthcare environment.

13. A computer-implemented method, comprising:

accessing, by a device operatively coupled to a processor, a first set of annotated data candidates defined by a plurality of feature categories, wherein the annotated data candidates respectively pertain to medical patients that have scheduled medical appointments;

training, by the device, a machine learning classifier sing a first training process on first feature vectors extracted from the first set to produce as output for each annotated data candidate, a classification label regarding attendance of the scheduled medical appointments of among three possible classification labels, thereby causing internal parameters of the machine learning classifier to become iteratively updated during the first training process, wherein the three classification labels include an on time arrival label, a late arrival label and a no arrival label;

extracting, by the device, numerical representations of the internal parameters of the machine learning classifier after completion of the first training process;

providing, by the device, the numerical representations as input to an importance score generation machine learning model;

executing, by the device, the importance score generation machine learning model to generate respective importance scores for the feature categories;

removing, by the device, respective feature categories of the plurality of feature categories of the first set having importance scores that fail to satisfy a threshold value, thereby yielding a second set of annotated data candidates; and retraining, by the device, the machine learning classifier using a second machine learning process on second feature vectors extracted from the second set, thereby generating an optimized version of the machine learning classifier, wherein the second feature vectors having a reduced feature vector dimensionality relative to the first feature vectors.

14. The computer-implemented method of claim 13, wherein the machine learning classifier is an XGBoost model, and wherein the internal parameters include decision tree thresholds of the XGBoost model or decision tree locations of the XGBoost model.

15. The computer-implemented method of claim 14, wherein the first training comprises splitting, by the system, the first set of annotated data candidates according to annotation based on Gini impurity.

16. The computer-implemented method of claim 13, wherein the feature categories include a patient demographics feature category, a patient medical record feature category, a weather feature category, and a traffic feature category.

17. A non-transitory computer program product for facilitating automated training of machine learning classification for patient missed care opportunities or late arrivals, the computer program product comprising a computer-readable memory having program instructions embodied therewith, the program instructions executable by a processor to cause the processor to:

access a first set of annotated data candidates defined by a plurality of feature categories, wherein the annotated data candidates respectively pertain to medical patients that have scheduled medical appointments;

train a machine learning classifier sing a first training process on first feature vectors extracted from the first set to produce as output for each annotated data candidate, a classification label regarding attendance of the scheduled medical appointments of among three possible classification labels, thereby causing internal parameters of the machine learning classifier to become iteratively updated during the first training process, wherein the three classification labels include an on time arrival label, a late arrival label and a no arrival label;

extract numerical representations of the internal parameters of the machine learning classifier after completion of the first training process;

provide the numerical representations as input to an importance score generation machine learning model;

execute the importance score generation machine learning model to generate respective importance scores for the feature categories;

remove respective feature categories of the plurality of feature categories of the first set having importance scores that fail to satisfy a threshold value, thereby yielding a second set of annotated data candidates; and retrain the machine learning classifier using a second machine learning process on second feature vectors extracted from the second set, thereby generating an optimized version of the machine learning classifier, wherein the second feature vectors having a reduced feature vector dimensionality relative to the first feature vectors.

18. The non-transitory computer program product of claim 17, wherein the machine learning classifier is an XGBoost model, and wherein the internal parameters include decision tree thresholds of the XGBoost model or decision tree locations of the XGBoost model.

19. The non-transitory computer program product of claim 17, wherein the program instructions further cause the processor to:

render, on an electronic display, the respective importance scores for the feature categories.

20. The non-transitory computer program product of claim 17, wherein the program instructions further cause the processor to:

render, on an electronic display, an indication of the respective feature categories that fail to satisfy the threshold value.

* * * * *